US006537217B1

(12) United States Patent
Bjærum et al.

(10) Patent No.: US 6,537,217 B1
(45) Date of Patent: Mar. 25, 2003

(54) METHOD AND APPARATUS FOR IMPROVED SPATIAL AND TEMPORAL RESOLUTION IN ULTRASOUND IMAGING

(75) Inventors: Steinar Bjærum, Horten (NO); Johan Kirkhorn, Horten (NO); Hans Garmann Torp, Trondheim (NO); Kjetil Viggen, Trondheim (NO); Björn Olstad, Stathelle (NO); Kjell Kristoffersen, Olso (NO); Erik N. Steen, Moss (NO); Dagfinn Saetre, Horten (NO)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/682,358

(22) Filed: Aug. 24, 2001

(51) Int. Cl.[7] .................................................. A61B 8/12
(52) U.S. Cl. ....................... 600/441; 600/440; 600/447; 600/453; 600/454; 600/455
(58) Field of Search ................... 600/437–472

(56) References Cited

U.S. PATENT DOCUMENTS

| | | | | |
|---|---|---|---|---|
| 4,398,540 A | * | 8/1983 | Takemura et al. | 348/163 |
| 5,709,210 A | * | 1/1998 | Green et al. | 600/453 |
| 5,919,137 A | * | 7/1999 | Finger et al. | 600/440 |
| 5,967,985 A | * | 10/1999 | Hayakawa | 310/334 |
| 6,063,032 A | * | 5/2000 | Grunwald | 600/440 |
| 6,146,329 A | * | 11/2000 | Hayakawa | 310/334 |
| 6,221,016 B1 | * | 4/2001 | Hayakawa | 600/443 |

* cited by examiner

*Primary Examiner*—Francis J. Jaworski
*Assistant Examiner*—William Jung
(74) *Attorney, Agent, or Firm*—McAndrews, Held & Malloy, Ltd.; Peter J. Vogel; Micahel A. Dellapenna

(57) ABSTRACT

A method is provided to simultaneously acquire two ultrasound images. A first set of ultrasound pulses are transmitted at a first frame rate utilizing a first mode of operation. The echoes from the first set of ultrasound pulses are received. A second set of ultrasound pulses are transmitted at a second frame rate utilizing a second mode of operation. The first and second frame rates are different. The first set of ultrasound pulses defines an entire image, while the second set of ultrasound pulses defines a partial image. The echoes from the second set of ultrasound pulses are received, and the echoes from the first and second sets of ultrasound pulses are displayed as a single image.

24 Claims, 19 Drawing Sheets

FIG. 15

METHOD AND APPARATUS FOR IMPROVED SPATIAL AND TEMPORAL RESOLUTION IN ULTRASOUND IMAGING

BACKGROUND OF INVENTION

Certain embodiments of the present invention relate to ultrasound imaging of the human anatomy for the purpose of medical diagnosis. In particular, certain embodiments of the present invention relate to methods and apparatus for improving spatial and temporal resolution in the ultrasound image.

Two dimensional (2D) ultrasound Doppler imaging is used for blood flow visualization within the body, as well as for visualization of muscular tissue movement and deformation, such as forced compression of the human breast. A B-mode grayscale sector and 2D Doppler information in a sector covering all or part of the B-mode sector may be separately acquired. The Doppler information is color-coded and overlaid onto the B-mode grayscale image to visualize the velocity information of an area of interest. Because the grayscale image is used to visualize tissue structures and the Doppler image is used to represent velocity information, the B-mode image is often referred to as the "tissue image".

Prior techniques combine a high resolution 2D B-mode image with a lower resolution 2D Doppler image, acquired with the same frame rate. For example, FIG. 2 illustrates the geometry for a conventional sector scanned 2D Doppler acquisition. The geometry image 202 shows a Doppler sector image overlaid on a B-mode sector image. The B-mode sector image 204 is comprised of B-mode transmit beams 206. The Doppler sector image 208 is comprised of Doppler transmit beam directions 210. In this example, the number of B-mode transmit beams ($N_B$) is 12, and the number of Doppler transmit beam directions ($N_D$) is 4. Thus, the B-mode sector image 204 has a higher beam density and a higher resolution than the Doppler sector image 208.

FIG. 3 illustrates a scan sequence of a conventional 2D Doppler acquisition. Twelve Doppler pulses 302–324 and twelve B-mode pulses 326–348 are illustrated. First, the Doppler pulses 302–324 are transmitted sequentially, starting with Doppler pulse 302. Then the B-mode pulses 326–348 are transmitted sequentially, starting with B-mode pulse 326. The B-mode pulses 326–348 are labeled to indicate transmission direction. For example, B-mode pulse 326 labeled $B_1$ indicates that the B-mode pulse is transmitted in direction 1. B-mode pulse 346 labeled $B_{11}$ indicates that the pulse is transmitted in direction 11. The Doppler pulses 302–324 are labeled such that D indicates a Doppler pulse transmission j in direction i. The Doppler pulses 302–324 are each part of a packet 350–356. Each Doppler pulse 302–324 transmitted in the same direction is part of the same packet 350–356. The packet size (PS) is the number of Doppler pulses 302–324 in each packet 350–356. For example, the PS of FIG. 3 is 3. Therefore, each packet 350–356 comprises the Doppler pulses 302–324 transmitted in one transmit beam direction, and each packet 350–356 is transmitted in a different direction.

The velocities for 2D Doppler are estimated at points along each beam direction based on the received signals from the packets 350–356. For example, the Doppler pulses 302, 304, and 306 each may be used to estimate a velocity measurement for packet 350 in beam direction 1. The time between two Doppler pulses within a packet is called the Doppler pulse repetition time ($PRT_D$), thus the Doppler pulse repetition frequency ($PRF_D$) is $PRF_D=1/PRT_D$.

The depth in the body of the item of interest will determine the maximum $PRF_D$ ($PRF_{DMAX}$). The transmitted Doppler pulse 302–324 must propagate to the deepest item of interest and back to the transducer before a new pulse transmission can be made. Additionally, hardware limitations and reverberations from deep reflectors beyond the imaging depth may need to be considered. For FIG. 3, $PRF_D > 0.5 * PRF_{DMAX}$.

The time required to acquire one frame of Doppler and B-mode data is $T_{frame}$. The frame rate (FR) is calculated as $FR=1/T_{frame}$. Because one complete B-mode image frame is acquired between each Doppler image frame, the frame rate for Doppler ($FR_D$) is equal to the frame rate for B-mode ($FR_B$). During the acquisition of one image frame, the Doppler pulses 302–324 are each transmitted one time and the B-mode pulses 326–348 are each transmitted one time. The time to acquire one frame $T_{frame}$) may be calculated as:

$$T_{frame}=(N_D \times PS)/PRF_D + N_B/PRF_B \qquad \text{Equation 1}$$

where $T_{frame}$ is the time to acquire one image frame, $N_D$ is the number of Doppler transmit beam directions, PS is the packet size, $PRF_D$ is the Doppler pulse repetition frequency, $N_B$ is the number of B-mode transmit pulses per frame, and $PRF_B$ is the B-mode pulse repetition frequency. In FIG. 3, for example, $N_D=4$, PS=3, and $N_B=12$.

FIG. 4 illustrates a scan sequence of a conventional 2D Doppler acquisition utilizing interleaving of the Doppler pulses and the B-mode pulses. Twelve Doppler pulses 402–424 and twelve B-mode pulses 426–448 are illustrated. The Doppler pulses 402–424 are each part of a packet 450–456. Each packet 450–456 comprises the pulses transmitted in one beam direction, and each packet 450–456 is transmitted in a different direction.

As in FIG. 3, FIG. 4 has 4 Doppler transmit beam directions. In FIG. 4, however, the transmit beam directions, each comprised of three Doppler pulses 402–424, are interleaved with the B-mode pulses 426–448. First, Doppler pulses 402–406 are transmitted in direction 1. Next, B-mode pulses 426–430 are transmitted, then Doppler pulses 408–412 are transmitted in direction 2, and so on. By interleaving the B-mode pulses 426–448 into the Doppler pulse 402–424 sequence, the timing difference between acquiring the Doppler image and acquiring the underlying B-mode image is reduced. The acquisition time per frame has not changed however, thus the time to acquire the Doppler scan image is the same as the time to acquire the B-mode scan image. To put it another way, one B-mode image is acquired for every Doppler image. Therefore, the $FR_D$ is equal to the $FR_B$.

When lower velocities are measured, the $PRF_D$ may be decreased. If the $PRF_D$ decreases, the acquisition time per frame may increase and the frame rate may decrease, as illustrated by Equation 1. The frame rate may be maintained, however, by utilizing Doppler beam interleaving. After transmitting a Doppler pulse in a first direction, Doppler pulses are transmit in one or more other directions before transmitting the second pulse in the first direction. In Doppler beam interleaving, the Interleave Group Size (IGS) indicates the number of Doppler beam directions that are interleaved.

Therefore, for lower velocities, the same frame rate can be maintained with the same number of transmit directions by using Doppler beam interleaving where IGS is an integer $\geq 2$, and $PRF_D \leq PRF_{Dmax}/IGS$. If $PRF_{Dmax}=PRF_D*IGS$ is kept constant, the scanning time per frame remains constant when $PRF_D$ is reduced. Thus, $PRF_{Dmax}$ may be kept constant by increasing the IGS when the $PRF_D$ decreases, as illustrated in the following relationship:

$T_{frame}=(N_D \times PS)/(PRF_D \times IGS)+N_B/PRF_B=(N_D \times PS)/PRF_{Dmax}+N_B/PRF_B$ FIG. 5 illustrates a scan sequence of a conventional 2D Doppler acquisition with 2 Doppler transmit directions interleaved. Twelve Doppler pulses 502–524 followed in time by twelve B-mode pulses 526–548 are illustrated.

As described in FIG. 3, Doppler pulses are each part of a packet that comprises the pulse transmissions along one beam direction in the image. In FIG. 3, all of the Doppler pulses that comprise a packet are transmitted before transmitting a Doppler pulse of a different packet. In FIG. 5, however, the Doppler pulses 502–524 utilize Doppler beam interleaving as discussed previously. Doppler pulse 502 is transmitted in direction 1, then Doppler pulse 504 is transmitted in direction 2. Next, Doppler pulse 506 is transmitted in direction 1, then Doppler pulse 508 is transmitted in direction 2. The IGS of FIG. 5 is 2, because two Doppler transmit beam directions are interleaved. Once the Doppler transmit beams are completed, then the B-mode pulses are transmitted.

FIG. 6 illustrates a scan sequence of a conventional 2D Doppler acquisition with 4 Doppler transmit directions interleaved. Twelve Doppler pulses 602–624 and twelve B-mode pulses 626–648 are illustrated. One Doppler pulse 602–624 is transmitted in each of the 4 transmit directions before a second Doppler pulse 602–624 is transmitted in any direction. The IGS of FIG. 6 is 4.

In addition to the techniques above, it is possible to obtain several received beams for each transmitted pulse by focusing in slightly different directions. This technique is called parallel beamforming or Multi-Line Acquisition (MLA). The number of parallel receive beams per B-mode transmit beam ($MLA_B$) may be different than the number of parallel receive beams per Doppler transmit beam ($MLA_D$).

Below is an example of the frame rate and beam densities achieved with a conventional packet acquisition setup utilizing MLA for cardiac imaging. In this example, the $PRF_B$ is lower than the $PRF_D$ to minimize reverberation effects:

| | |
|---|---|
| $PRF_B$ = 3 kHz | $PRF_{Dmax}$ = $PRF_D$ * IGS = 4 kHz |
| $N_B$ = 36 | $N_D$ = 8 |
| $MLA_B$ = 2 | $MLA_D$ = 4 |
| | PS = 3 |
| Acquisition time per frame: | $T_{frame}$ = $N_D$ * PS/$PRF_{Dmax}$ + $N_B$/$PRF_B$ = 18 ms |
| Frame rate: | FR = 1/$T_{frame}$ = 55 Hz |
| Receive beams Doppler: | $MLA_D$ * $N_D$ = 32 |
| Receive beams B-mode: | $MLA_B$ * $N_B$ = 72 |

For tissue Doppler techniques there is a desire for frame rates considerably higher than what is achievable with the conventional 2D Doppler acquisition techniques discussed previously. Often the need to capture the details of flow jets or rapid tissue accelerations requires a high frame rate for the Doppler information, whereas the tissue B-mode image need not be updated as often. However, in order to achieve a high resolution B-mode image, the combined B-mode/Doppler frame rate becomes relatively low. For example, when assessing the rapid movement in the cardiac muscle during the relaxation phase of the cardiac cycle, the main problem with the aforementioned acquisition techniques is that the 2D Doppler frame rate can not be increased without decreasing the spatial resolution of the B-mode image. But in order to achieve the desired B-mode resolution in a sector covering the whole myocardium, the frame rate has to be reduced. For example, the frame rate of 55 Hz for conventional packet acquisition utilizing MLA as indicated above is much lower than the desired frame rate for cardiac imaging, which may be from 100 frames per second to as high as 300 frames per second for some applications.

Additionally, during B-mode imaging, there may be different demands on the resolution in different areas of a B-mode image. An example is when studying a heart valve. In a small region surrounding the valve, both high spatial and temporal resolution are desired. The other parts of the image are mainly used for orientation, and a lower resolution is acceptable.

Thus, a need has long existed in the industry for a method and apparatus for acquiring ultrasound data that addresses the problems noted above and previously experienced.

SUMMARY OF INVENTION

In accordance with at least one embodiment, a method is provided to simultaneously acquire two ultrasound images. A first set of ultrasound pulses is transmitted at a first frame rate in accordance with a first mode of operation. The echoes from the first set of ultrasound pulses are received. A second set of ultrasound pulses is transmitted at a second frame rate different from the first frame rate in accordance with a second mode of operation. The echoes from the first and second set of ultrasound pulses are displayed as one image.

In an alternative embodiment, the first set of ultrasound pulses defines a Doppler image and the second set of ultrasound pulses defines a portion of a B-mode image. A first portion of the B-mode image may be obtained before the Doppler image is obtained. Then a second portion of the B-mode image is obtained after the Doppler image is obtained. The Doppler and B-mode images are overlaid to display one image.

In another embodiment, the first set of ultrasound pulses defines a high resolution B-mode image and the second set of ultrasound pulses defines a low resolution B-mode image. The portion of the low resolution B-mode image underlying the high resolution B-mode image may be obtained using the ultrasound pulses defining the high resolution B-mode image. The high and low resolution B-mode images are overlaid to display one image.

In an alternative embodiment, a portion of a Doppler image may be calculated by transmitting a series of uninterrupted, successive pulses in a common direction and detecting the echoes returned from the series of successive pulses. A first packet of successive Doppler pulses directed in a first direction is transmitted, followed by a second packet of successive Doppler pulses directed in a second direction. In another embodiment, the Doppler pulses may be interleaved, wherein one pulse of the first packet is transmitted followed by one pulse of the second packet. In an alternative embodiment, the first set of ultrasound pulses and the second set of ultrasound pulses may be interleaved.

The first packet of successive Doppler pulses is transmitted in a first direction. After the non-Doppler echoes are received, a second packet of successive Doppler pulses is transmitted in a second direction.

In an alternative embodiment, an image based on the received echoes from the Doppler pulses is comprised of a number of transmit directions, and one Doppler pulse is transmitted in each direction. A Doppler image is calculated by utilizing a sliding window technique based upon the received echoes.

In accordance with at least one embodiment, a method for obtaining ultrasound images of an area of interest is provided. A set of Doppler pulses is transmitted and the Doppler echoes are received. A set of non-Doppler pulses corresponding to a sub-region of a displayed image is transmitted and the non-Doppler echoes are received. Images based on the Doppler and non-Doppler echoes are displayed.

In one embodiment, the non-Doppler pulses correspond to a sub-region of an image. In another embodiment, the Doppler echoes form a complete image and the non-Doppler echoes form a partial image. Therefore, the set of Doppler pulses defines more image frames than the set of non-Doppler pulses.

In another embodiment, a scan sequence of transmitting and receiving pulses is divided into scan intervals. The scan interval in which non-Doppler pulses are transmitted and received may be suspended. In another embodiment, non-Doppler pulses associated with a first sub-region of a non-Doppler image are transmitted in a first scan interval and non-Doppler pulses associated with a second sub-region of a non-Doppler image are transmitted in a second scan interval.

BRIEF DESCRIPTION OF DRAWINGS

FIG. 15 illustrates a scan sequence of a B-mode acquisition utilizing continuous B-mode acquisition and a second B-mode acquisition with a reduced frame rate obtained in accordance with an embodiment of the present invention.

The foregoing summary, as well as the following detailed description of the embodiments of the present invention, will be better understood when read in conjunction with the appended drawings. It should be understood, however, that the present invention is not limited to the arrangements and instrumentality shown in the attached drawings.

DETAILED DESCRIPTION

Figure 1:
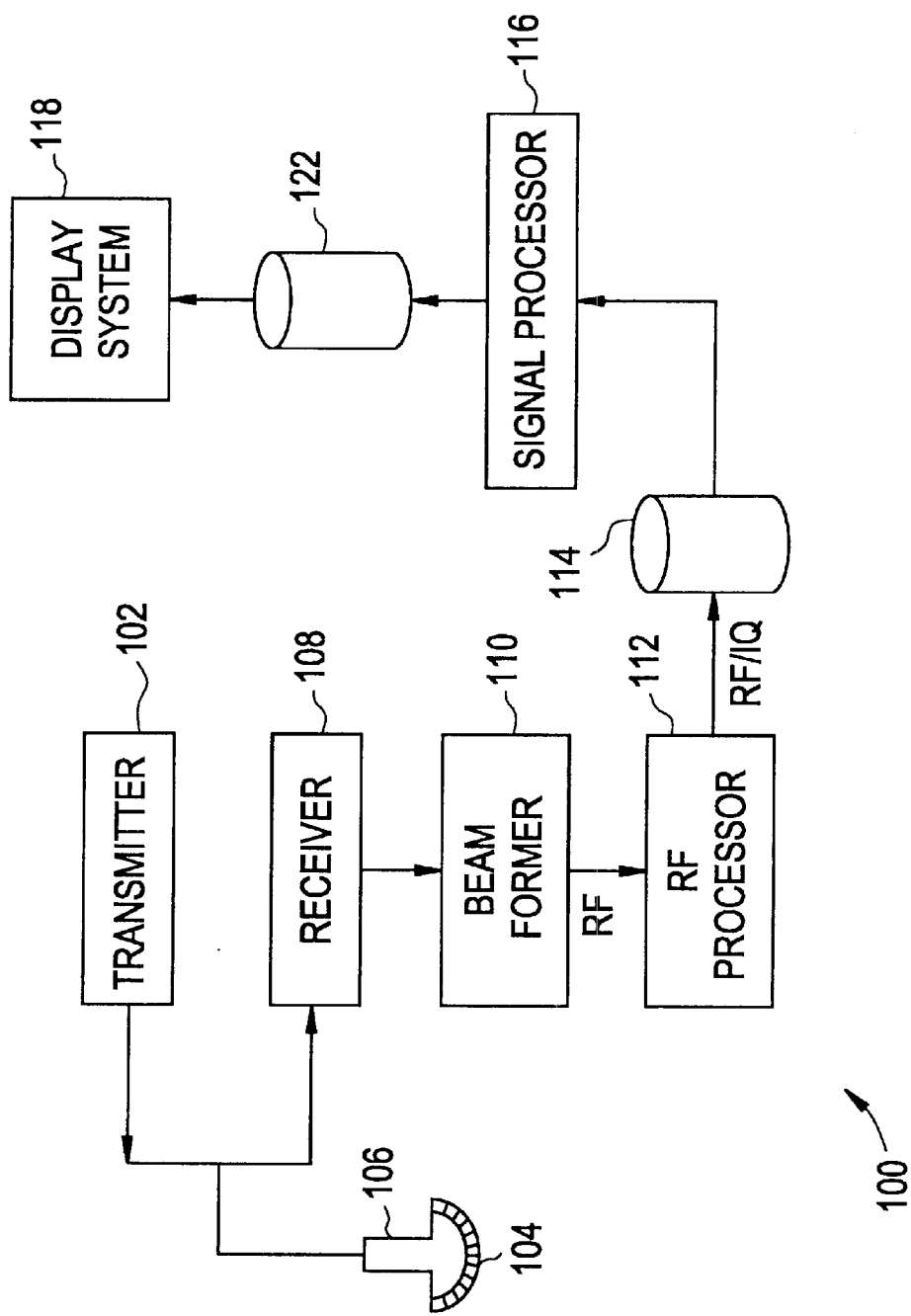
FIG. 1 illustrates a block diagram of an ultrasound system formed in accordance with an embodiment of the present invention.
Figure 2:
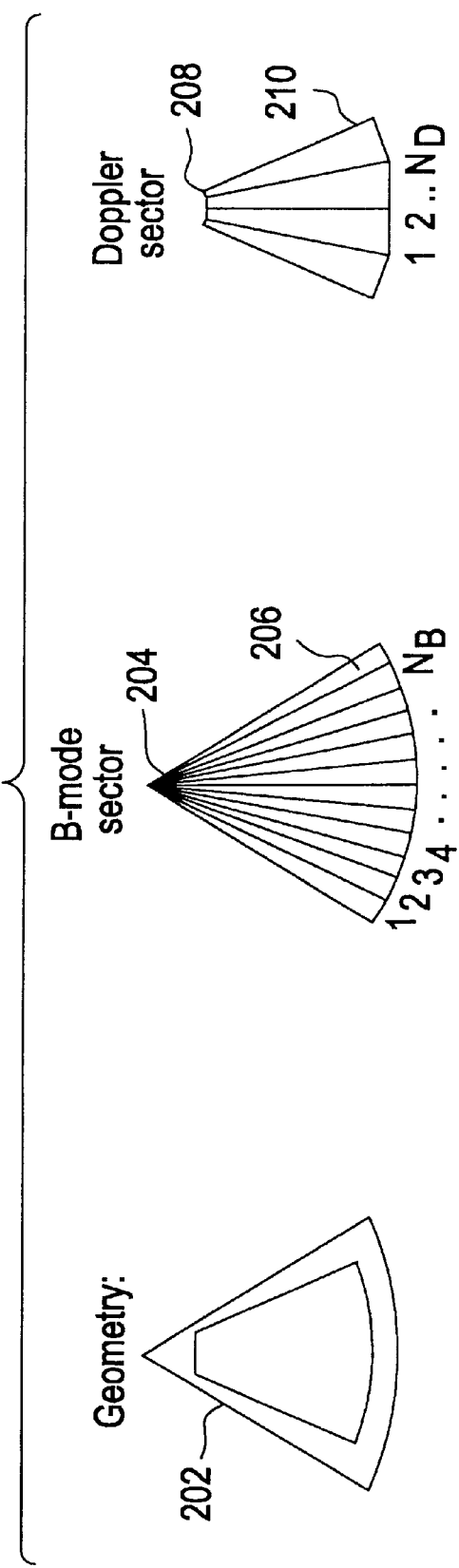
FIG. 2 illustrates the geometry for a conventional sector scanned 2D Doppler acquisition.
Figure 3:
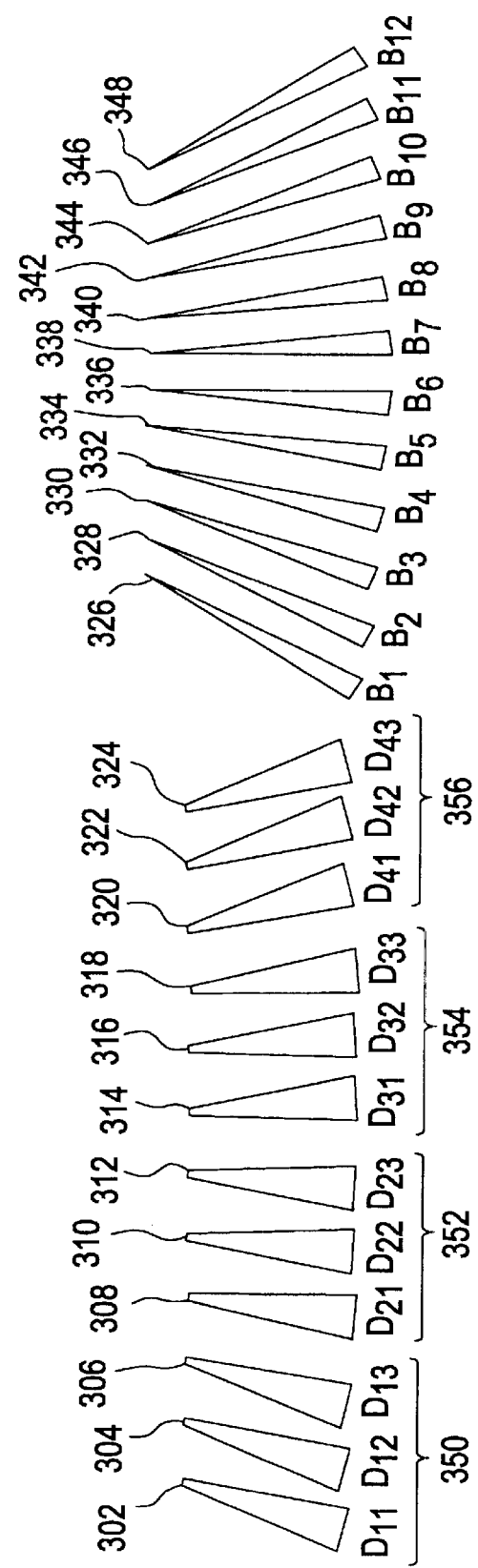
FIG. 3 illustrates a scan sequence of a conventional 2D Doppler acquisition.
Figure 4:
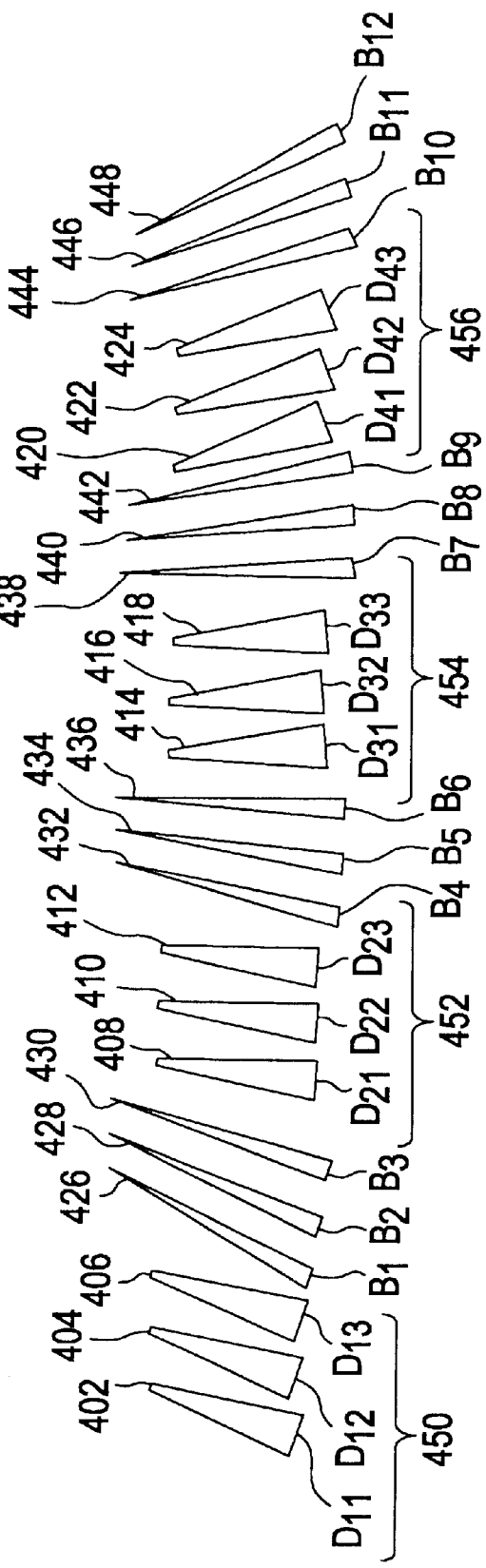
FIG. 4 illustrates a scan sequence of a conventional 2D Doppler acquisition utilizing interleaving of the Doppler pulses and the B-mode pulses.

FIG. 1 illustrates a block diagram of an ultrasound system 100 formed in accordance with an embodiment of the present invention. The ultrasound system 100 includes a transmitter 102 which drives transducers 104 within a probe 106 to emit pulsed ultrasonic signals into a body. Any probe geometry may be used as long as the probe 106 is capable of fast beam interleaving. The ultrasonic signals are backscattered from structures in the body, like blood cells or muscular tissue, to produce echoes which return to the transducers 104. The echoes are received by a receiver 108. The received echoes are passed through a beamformer 110, which performs beamforming and outputs an RF signal. The RF signal then passes through an RF processor 112. Alternatively, the RF processor 112 may include a complex demodulator (not shown) that demodulates the RF signal to form IQ data pairs representative of the echo signals. The RF or IQ signal data may then be routed directly to RF/IQ buffer 114 for temporary storage.

The ultrasound system 100 also includes a signal processor 116 to process the acquired ultrasound information (i.e., RF signal data or IQ data pairs) and prepare frames of ultrasound information for display on display system 118. The signal processor 116 is adapted to perform one or more processing operations according to a plurality of selectable ultrasound modalities on the acquired ultrasound information. Acquired ultrasound information may be processed in real-time during a scanning session as the echo signals are received. Additionally or alternatively, the ultrasound information may be stored temporarily in RF/IQ buffer 114 during a scanning session and processed in less than real-time in a live or off-line operation.

The ultrasound system 100 often continuously acquires ultrasound information at a frame rate that exceeds 50 frames per second—the approximate perception rate of the human eye. The acquired ultrasound information is displayed on the display system 118 at a slower frame-rate. An image buffer 122 is included for storing processed frames of acquired ultrasound information that are not scheduled to be displayed immediately. Preferably, the image buffer 122 is of sufficient capacity to store at least several seconds worth of frames of ultrasound information. The frames of ultrasound information are stored in a manner to facilitate retrieval thereof according to its order or time of acquisition. The image buffer 122 may comprise any known data storage medium.

Figure 7:
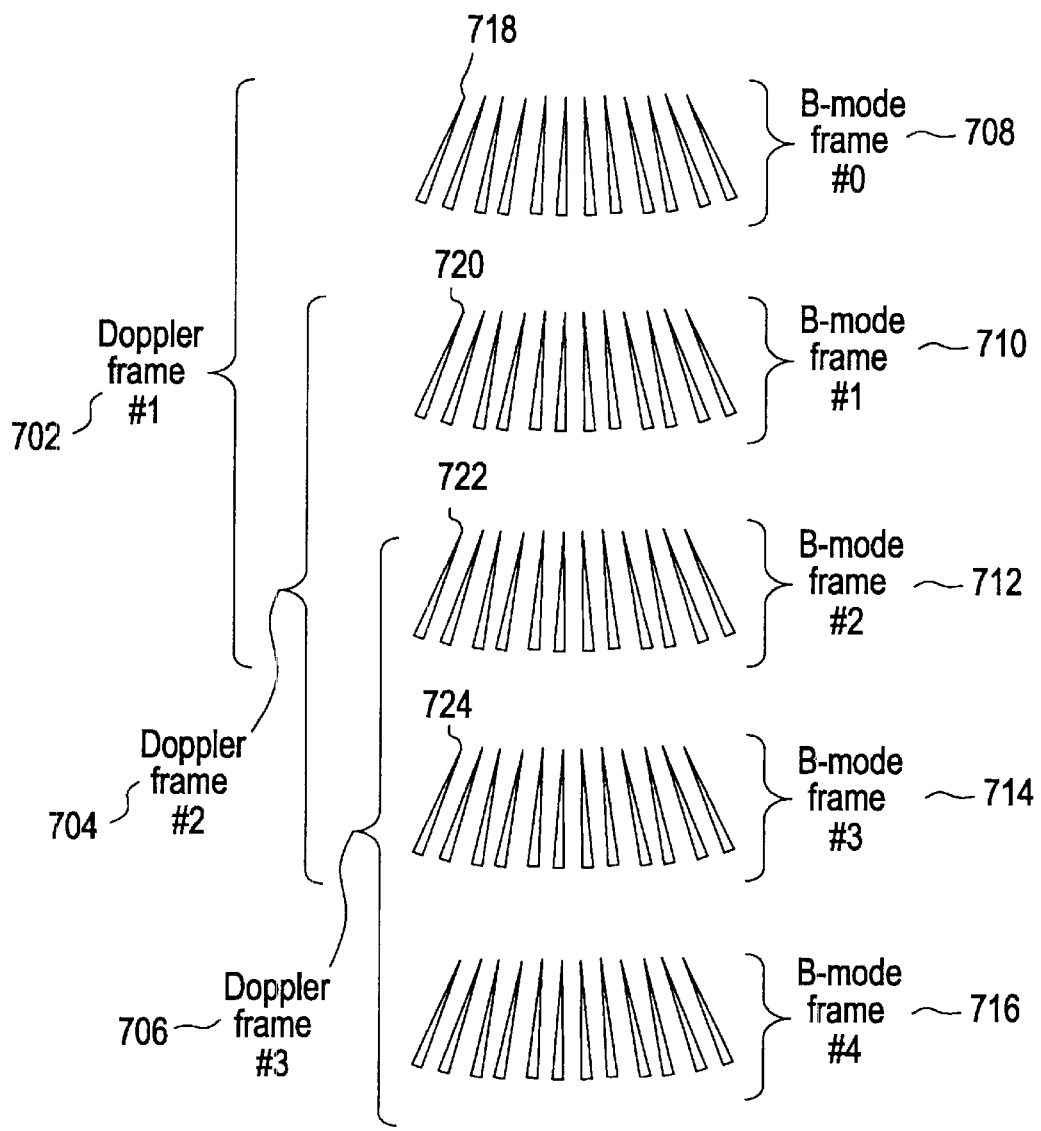
FIG. 7 illustrates a method of computing Doppler and B-mode images from the same transmit pulses utilizing a sliding window technique obtained in accordance with an embodiment of the present invention.

FIG. 7 illustrates a method of computing Doppler and B-mode images from the same transmit pulses utilizing a sliding window technique. Doppler frames 702–706 and B-mode frames 708–716 are illustrated. There are five sets of transmit pulses that are transmitted in even time intervals.

Calculating the Doppler and B-mode images from the same pulse transmissions can increase the frame rate. The Doppler data are acquired with constant sampling intervals, and can be processed using a sliding window technique as shown in FIG. 7. For example, pulse transmissions 718, 720, and 722 are utilized to compute Doppler data in one beam direction for Doppler frame 702. Pulse transmissions 720, 722, and 724 are utilized to compute Doppler data in one beam direction for Doppler frame 704. Below is an example of the frame rate and beam densities achieved with this technique for cardiac imaging:

| | |
|---|---|
| $PRF_B = PRF_D = 4$ kHz | $N_B = N_D = 12$ |
| $MLA_B = MLA_D = 4$ | |
| Acquisition time per frame: | $T_{frame} = N_B/PRF_B = 3$ ms |
| Frame rate B-mode and Doppler: | $FR_B = FR_D = 1/T_{frame} = 333$ Hz |
| Receive beams Doppler: | $MLA_D * N_D = 48$ |
| Receive beams B-mode: | $MLA_B * N_B = 48$ | where $T_{frame}$ is the time required to acquire one image frame, $N_D$ is the number of Doppler transmit beam directions, $N_B$ is the number of B-mode transmit pulses per frame, $PRF_D$ is the Doppler pulse repetition frequency, $PRF_B$ is the B-mode pulse repetition frequency, $MLA_B$ is the number of parallel receive beams per B-mode transmit beam, $MLA_D$ is the number of parallel receive beams per Doppler transmit beam, $FR_B$ is the B-mode frame rate, and $FR_D$ is the Doppler frame rate.

With this acquisition method, $PRF_D$ equals the frame rate. The frame rate of 333 Hz achieved for the system 100 utilizing MLA and the sliding window method to calculate the Doppler frames is more desirable than the system 100 that achieved a frame rate of 55 Hz utilizing MLA with conventional packet acquisition. However, to achieve a sufficient PRFD and frame rate, the number of transmitted pulses for each achieve a sufficient $PRF_D$ and frame rate, the number of transmitted pulses for each necessary to image a wide sector. Another drawback with this technique is that the B-mode and Doppler pulses can not be differently optimized, for example in terms of frequency and pulse length.

The aforementioned limitations may be overcome by scanning the B-mode region with a high beam density (e.g. high spatial resolution) and a low frame rate, and scanning the Doppler region, which may be smaller than the B-mode region, with a lower beam density (e.g. lower spatial resolution) and a higher frame rate. The B-mode and Doppler images are acquired by fast beam interleaving between the two modalities.

Separate pulses are used for the high resolution B-mode image, and are transmitted in between the Doppler pulses. The mean number of B-mode pulses and Doppler pulses per time unit can be varied to obtain a requested beam density and frame rate for the B-mode and Doppler images. The region of interest (ROI) of the Doppler image may be different from the size of the tissue image, and may be moved by the operator in order to focus on a different area of anatomy.

For blood flow imaging, acquiring a low resolution Doppler image and a high resolution B-mode image is also especially well suited in combination with Blood Motion Imaging (BMI), which is a method to enhance and display speckle pattern in the blood vessel giving the operator a visual perception of the blood movement.

Alternatively, a multiple resolution B-mode image may be acquired. Separate pulses are used for a high resolution B-mode image inside a ROI, and are transmitted between pulses used to acquire the surrounding lower resolution B-mode image. The ROI is updated at a higher frame rate than the rest of the B-mode image, and may be moved to view a different ROI similar to the Doppler ROI.

The temporal resolution in B-mode imaging can be improved by temporal interpolation. For stationary targets, a linear interpolation in time between pixels is acceptable, but for moving targets (i.e. cardiac walls) the spatial details will be smeared out with linear interpolation. The interpolation can be improved by tracking the positions of the objects in the B-mode image. The acquisition technique described below provides Doppler data that can be used for position tracking to get high quality temporal interpolation of the B-mode image. Such a technique is especially useful for 3-dimensional scanning where the temporal resolution without any interpolation is relatively poor.

The high frame rate is a challenge for real-time display, because the human eye is limited to approximately 50 frames/sec. There are several possible options for real-time display:

1. Only the B-mode images are displayed on the display system 118, as a regular sequence of grayscale B-mode images. The Doppler image data are stored for post-processing.
2. Decimation in time of the Doppler images. The decimated stream of Doppler images is displayed as an overlay to the B-mode images on the display system 118. The Doppler image data are stored for post-processing with full time resolution.

3. Interpolation in time of the B-mode images. One B-mode image is generated for each Doppler image to achieve full Doppler frame rate. The time axis is divided into heart cycles. To be able to display all the image frames within a heart cycle on the display system 118, the frames from one or more of the subsequent heart cycles are not displayed.

4. Similar to 3, but the combined B-mode/Doppler images are decimated in time, as described in 2. This means that fewer heart cycles need to be discarded.

Several types of combined processing and display are of interest. Especially, temporal displays like M-modes (e.g. conventional, curved or anatomical) and curves of velocity-parameters (e.g. velocity, displacement, strain) versus time, where the high temporal resolution can be appreciated. Since the Doppler data covers the whole myocardium, these temporal displays can be shown simultaneously in several points of the image, and with no degradation in quality compared to single sample-volume methods.

The packet acquisition scan sequences discussed below divide the B-mode region into M sub-regions. M is the ratio between the Doppler frame rate and the B-mode frame rate, such that $M=FR_D/FR_B$. If M is an integer, each M sub-region is equally sized and comprises a number of B-mode pulses ($\Delta N_B$). Scan sequences in which M is not an integer will be further discussed below.

For each scan of a B-mode sub-region, the Doppler region is illuminated by $D=N_D*PS$ pulses. The number of pulses required to cover one of the B-mode sub-regions and the Doppler region is $N=\Delta N_B+D$, and the N pulses are interleaved in a predefined manner. One example of interleaving is shown below:

$B_{1n}D_{11}D_{21}D_{31}B_{2n}D_{12}D_{22}D_{32}B_{3n}D_{13}D_{23}D_{33}B_{4n}D_{14}D_{24}D_{34}$
where $\Delta N_B=4$, $N_D=4$, $PS=3$, and $B_{ij}$=B-mode pulse in direction i in sub-region j and $D_{ij}$=Doppler pulse number i in direction j.

The whole B-mode region is covered by repeating this pulse sequence M times, changing the B-mode sub-region for each sequence while keeping the Doppler region constant. The result is one B-mode frame with $N_B=M*\Delta N_B$ pulses, and M Doppler frames with a frame rate M times higher than the B-mode frame rate. Thus, in order to acquire one B-mode frame, the scan sequence is repeated M times. Or, for every B-mode frame that is acquired, M Doppler frames are acquired.

The time between two Doppler pulses within a packet is called the Doppler pulse repetition time ($PRT_D$), thus the Doppler pulse repetition frequency ($PRF_D$) is $PRF_D=1/PRT_D$. In order to achieve the desired $PRF_D$, the Doppler pulses may be distributed in space and time in different ways.

The technique described above, packet acquisition with reduced B-mode frame rate, is illustrated in FIGS. 8 through 13. The following parameters are utilized in FIGS. 8–11:

Number of Doppler transmit beam directions, $N_D=4$.
Packet size, $PS=3$.
Number of Doppler pulse trarmssions, $D=N_D*PS=12$.
Number of B-mode sub regions, $M=3$.
Number of beams per B-mode sub region, $\Delta N_B=4$.

Figure 8:
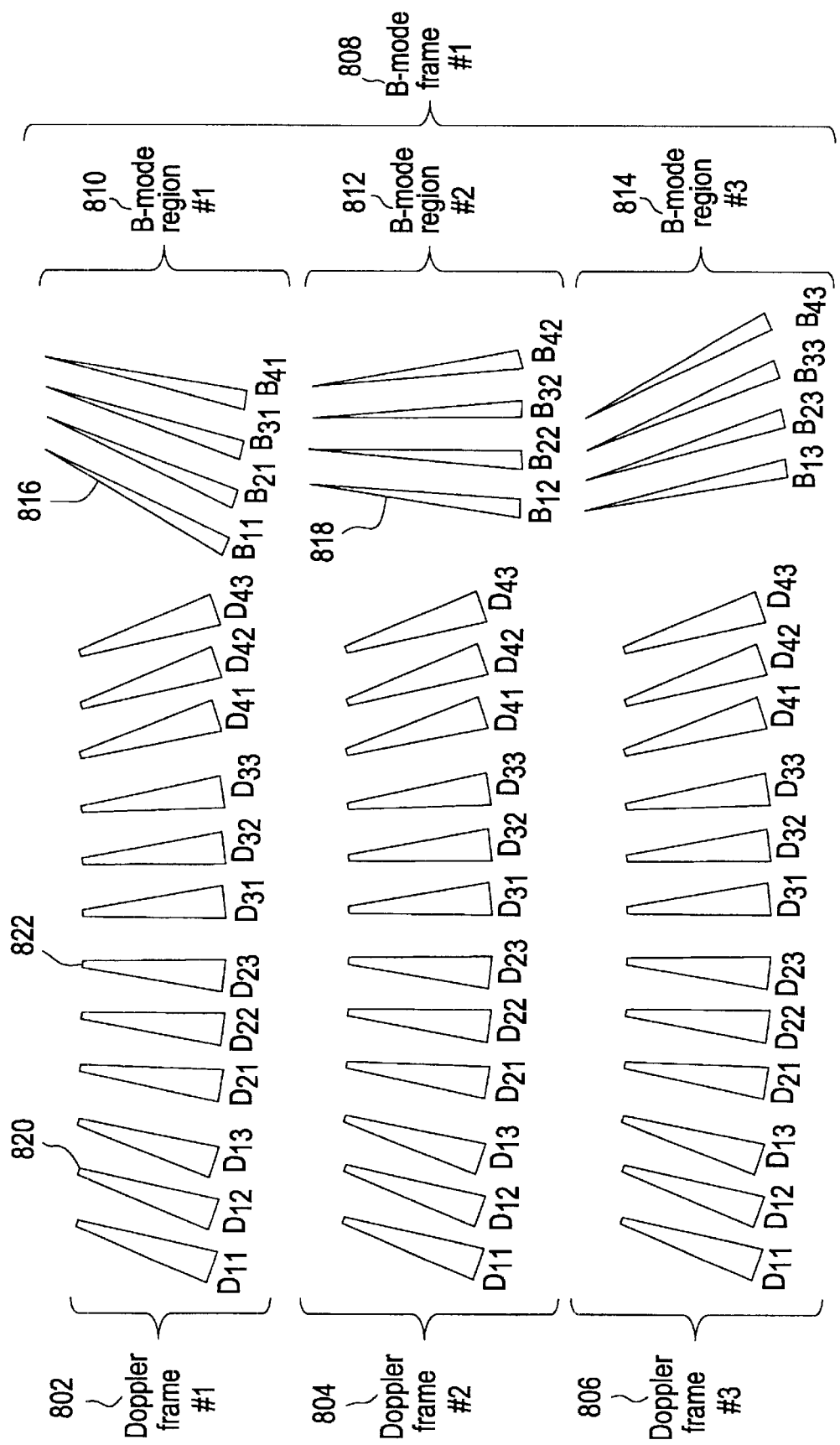
FIG. 8 illustrates a scan sequence of a 2D Doppler acquisition utilizing packet acquisition of 2D Doppler data with a reduced B-mode frame rate obtained in accordance with an embodiment of the present invention.

FIG. 8 illustrates a scan sequence utilizing packet acquisition of 2D Doppler data with a reduced B-mode frame rate. Three Doppler frames 802–806, each comprised of 12 Doppler pulses are illustrated. The Doppler pulses are arranged into four packets ($N_D=4$), with each packet containing three Doppler pulses ($PS=3$). Each packet is directed towards a different beam direction, as discussed previously. Three B-mode sub-regions 810–814, each comprised of 4 B-mode pulses ($\Delta N_B=4$) are illustrated. A B-Mode frame 808 is comprised of three B-mode sub-regions 810–814. For every Doppler frame 802–806 that is acquired, one third of the B-mode frame 808 is acquired.

The direction and order of transmission within the packets of each Doppler pulse is labeled. $D_{ij}$ indicates a Doppler pulse transmission j in direction i. For example, the label $D_{12}$ of Doppler pulse 820 indicates that Doppler pulse 820 is transmitted in direction 1, and is the second pulse (2) to be transmitted in direction 1. The label $D_{23}$ of Doppler pulse 822 indicates that Doppler pulse 822 is transmitted in direction 2, and is the third pulse (3) to be transmitted in direction 2. The aforementioned labeling, which indicates the transmission direction and order of transmission in each packet direction for Doppler pulses, is utilized by the remaining Figures.

Additionally, the direction and sub-region of each B-mode pulse is indicated, such that $B_{ij}$ indicates a B-mode pulse in direction i in sub-region j. For example, B-mode pulse 816 ($B_{11}$) is the first (1) B-mode beam direction in sub-region 1. B-mode pulse 818 ($B_{12}$) is the first (1) B-mode direction in sub-region 2.

The illustrated scan sequence of Doppler and B-mode pulses, transmission of the pulse on the left of FIG. 8 first, then sequentially transmitting the pulses moving to the right of the FIG. 8 will be utilized by the remaining Figures. Although not illustrated, any non-sequential scan sequence may be used.

The B-mode signal is received by the receiver 108 and converted to 8 bit pixels after log-detection. The pixels are displayed real-time on the display system 118, and stored in image buffer 122. The Doppler data are stored as 32 bit IQ data. Optionally, the IQ Doppler data may be converted to complex autocorrelation coefficients in real-time and stored in the image buffer 122. The IQ Doppler data may, for example, be used for 2D tissue Doppler imaging, strain rate imaging, or for visualization of integrated strain. The data may also be displayed on the display system 118 in M-mode (i.e. conventional, anatomical or curved). In addition, time/velocity curves, time/strain curves, and the like may be generated and displayed either real-time or in post processing.

Figure 9:
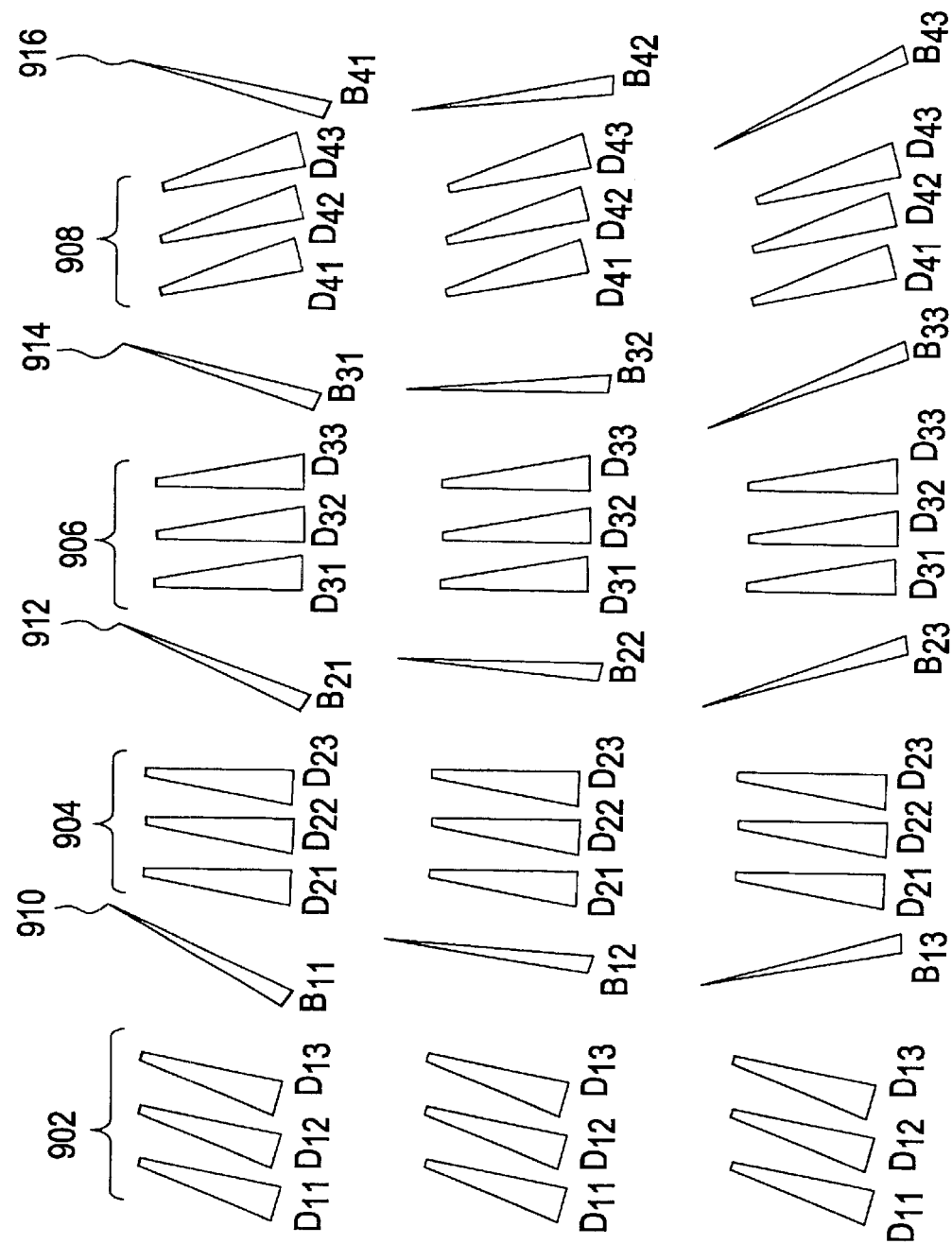
FIG. 9 illustrates a scan sequence of a 2D Doppler acquisition utilizing packet acquisition of 2D Doppler data with B-mode pulses interleaved between Doppler pulse packets and a reduced B-mode frame rate obtained in accordance with an embodiment of the present invention.

FIG. 9 illustrates a scan sequence utilizing packet acquisition of 2D Doppler data with B-mode pulses interleaved between Doppler pulse packets and a reduced B-mode frame rate. Doppler packets 902–908 and B-mode pulses 910–916 are illustrated, and the B-mode pulses 910–916 are interleaved with the Doppler packets 902–908. The scan sequences of FIGS. 8 and 9 are similar in that Doppler packets 902–908 comprise a Doppler frame, similar to Doppler frame 802, and the B-mode pulses 910–916 comprise a B-mode sub-region, similar to B-mode sub-region 810. Also, for every Doppler frame acquired in FIG. 9, one third of the B-mode frame is acquired.

The scan sequences illustrated in FIGS. 8 and 9 may be utilized when $PRF_D>0.5*PRF_{Dmax}$, because beam interleaving within the Doppler transmit directions is not possible. If a lower $PRF_D$ is used, scan sequences with interleaved Doppler transmit directions are possible, such as the scan sequences illustrated in FIGS. 10 and 11.

Figure 10:
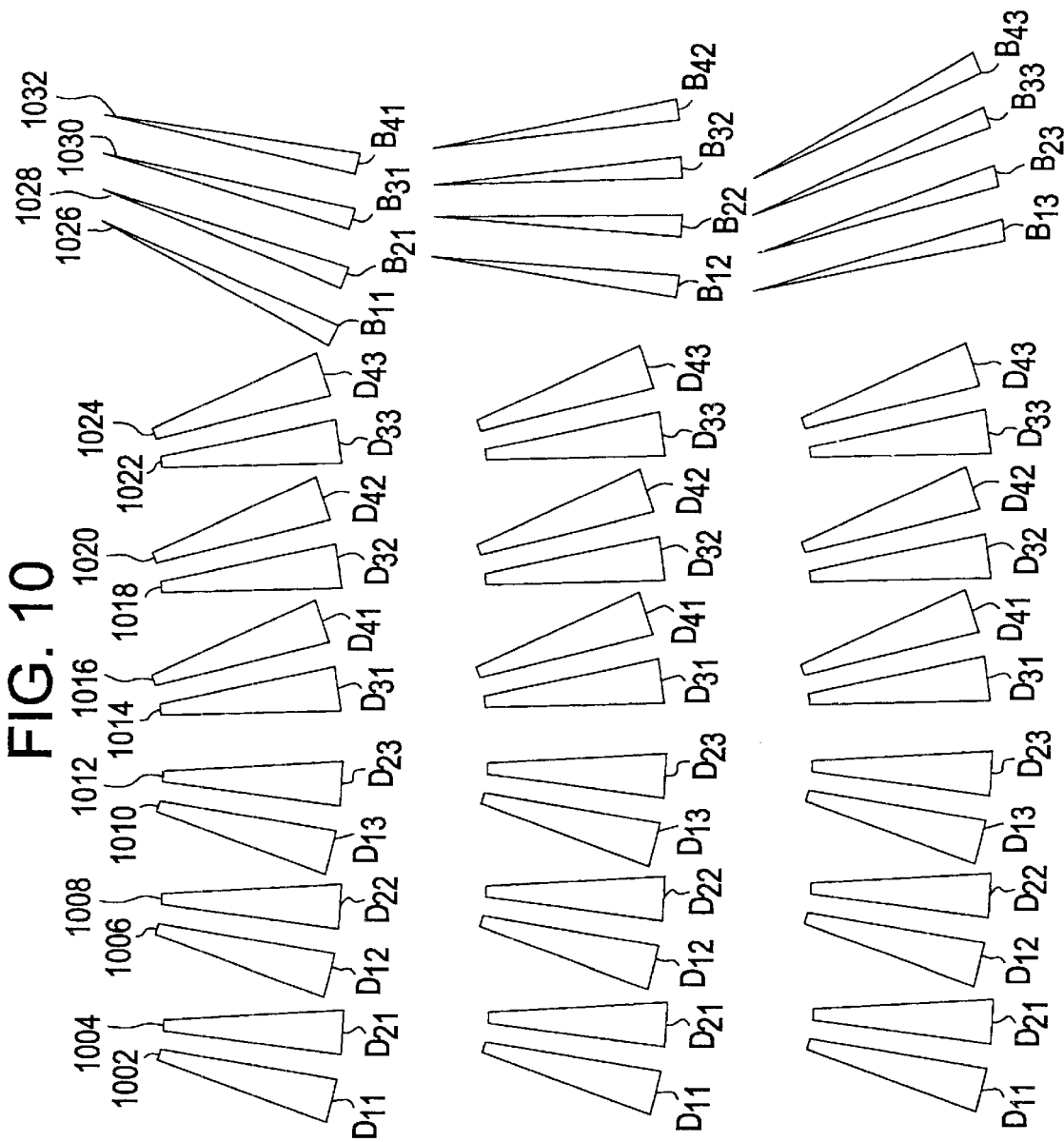
FIG. 10 illustrates a scan sequence of a 2D Doppler acquisition utilizing packet acquisition of 2D Doppler data with reduced B-mode frame rate and 2 interleaved Doppler transmit directions obtained in accordance with an embodiment of the present invention.

FIG. 10 illustrates a scan sequence utilizing packet acquisition of 2D Doppler data with reduced B-mode frame rate and 2 interleaved Doppler transmit directions.

Figure 11:
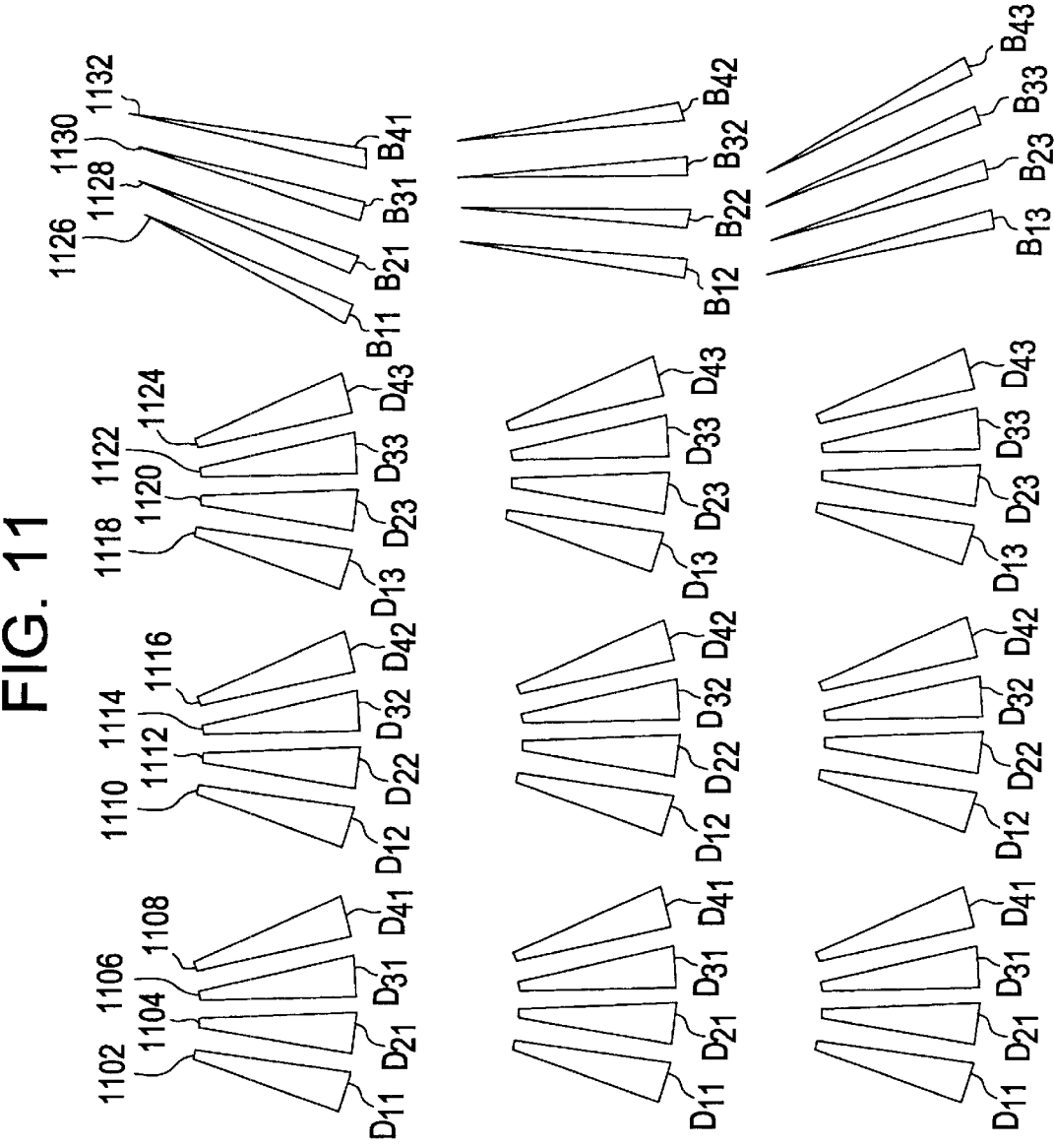
FIG. 11 illustrates a scan sequence of a 2D Doppler acquisition utilizing packet acquisition of 2D Doppler data with reduced B-mode frame rate and 4 interleaved Doppler transmit directions obtained in accordance with an embodiment of the present invention.

Doppler pulses 1002–1024 and B-mode pulses 1026–1032 are illustrated. FIG. 11 illustrates a scan sequence utilizing packet acquisition of 2D Doppler data with reduced B-mode frame rate and 4 interleaved Doppler transmit directions. Doppler pulses 1102–1124 and B-mode pulses 1126–1132 are illustrated.

Figure 5:
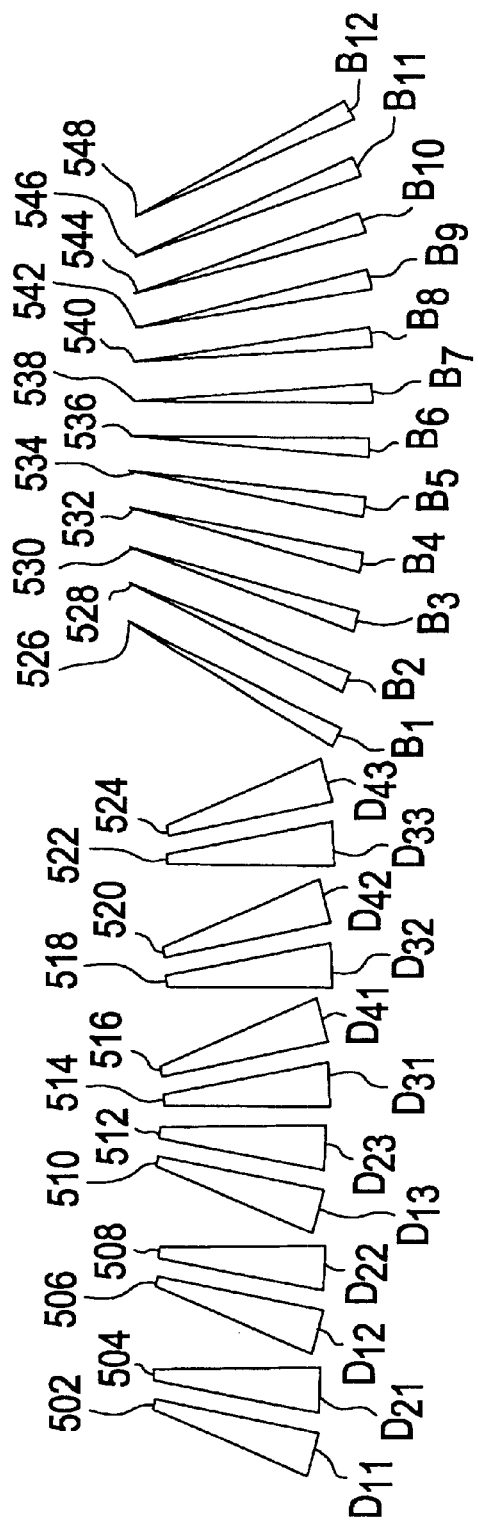
FIG. 5 illustrates a scan sequence of a conventional 2D Doppler acquisition with 2 Doppler transmit directions interleaved.
Figure 6:
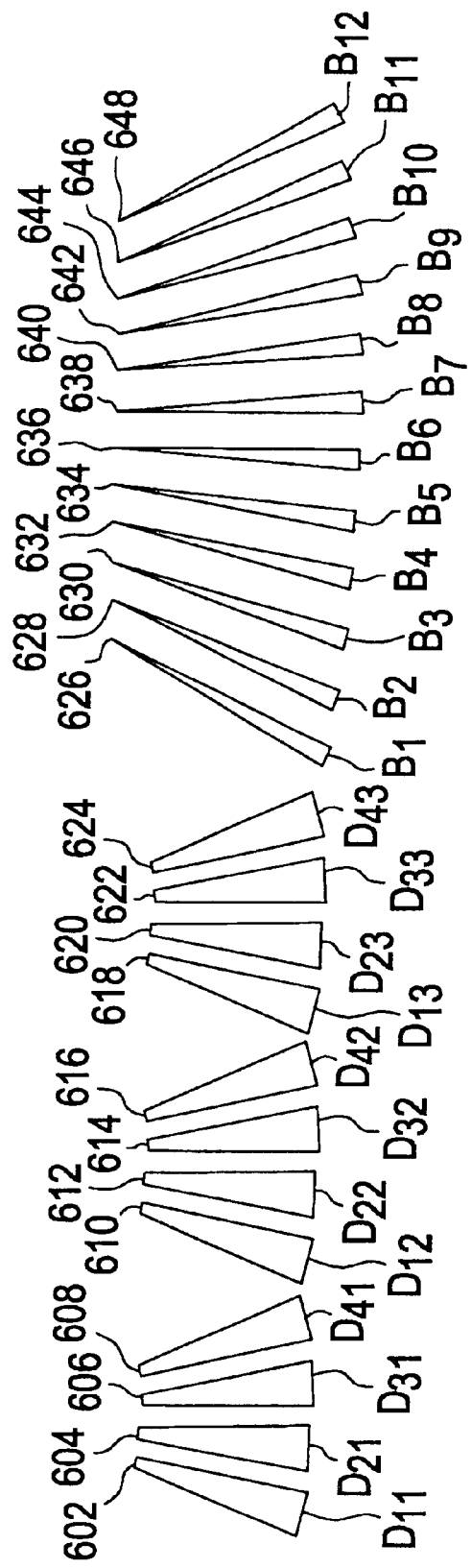
FIG. 6 illustrates a scan sequence of a conventional 2D Doppler acquisition with 4 Doppler transmit directions interleaved.

The scan sequence of FIG. 10 may be compared to the scan sequence of FIG. 5, and the scan sequence of FIG. 11 may be compared to the scan sequence of FIG. 6. In FIGS. 10 and 11, however, for every Doppler frame acquired, only one third of the B-mode frame is acquired. The scan sequences of FIGS. 10 and 11 are advantageous over the scan sequences of FIGS. 5 and 6 because the Doppler frame rate is higher than the B-mode frame rate.

Below is an example of achievable frame rates and beam densities with packet acquisition and different frame rates for B-mode frames and Doppler frames. The parameters indicated are suitable for cardiac imaging. In addition, the $PRF_B$ is lower than the $PRF_D$ to minimize reverberation effects.

| | |
|---|---|
| M = 3 | $N_D$ = 8 |
| $\Delta N_B$ = 4 | PS = 3 |
| $PRF_B$ = 3 KHz | $PRF_{Dmax}$ = $PRF_D$ * IGS = 4 kHz |
| $MLA_B$ = 2 | $MLA_D$ = 4 |
| Frame rate Doppler: | $FR_D$ = 1/($\Delta N_B$/$PRF_B$ + PS * $N_D$/$PRF_{Dmax}$) = 100 Hz |
| Frame rate B-mode: | $FR_B$ = $FR_D$/M = 33 Hz |
| Receive beams Doppler: | $MLA_D$ * $N_D$ = 32 |
| Receive beams B-mode: | $MLA_B$ * $\Delta N_B$ * M = 72 |

Figure 12:
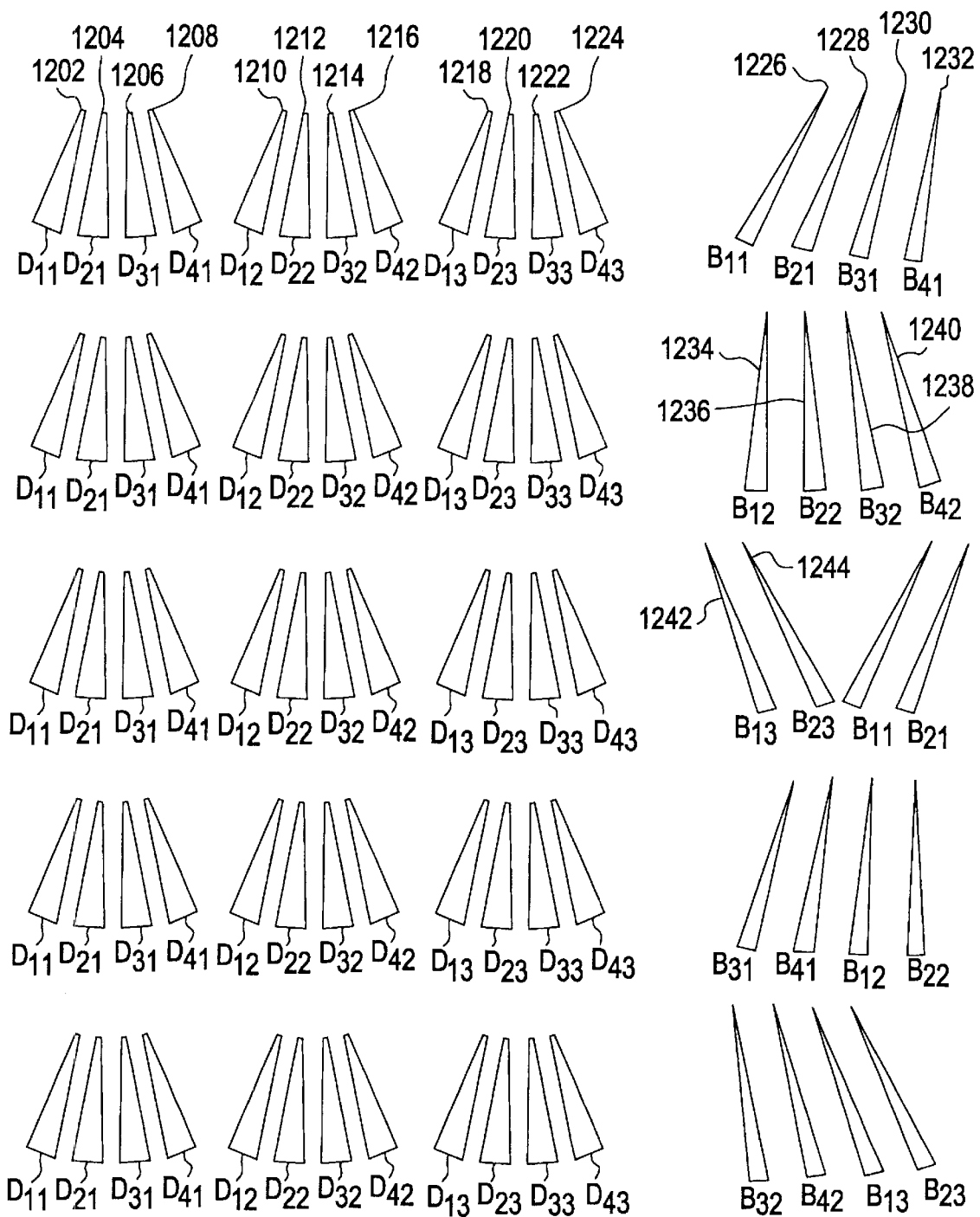
FIG. 12 illustrates a scan sequence of a 2D Doppler acquisition utilizing packet acquisition of 2D Doppler data with reduced B-mode frame rate and 4 interleaved Doppler transmit directions obtained in accordance with an embodiment of the present invention.

Although the value of M in FIGS. 8–11 was an integer, any fraction of M=$FR_B$/$FR_D$ is possible. FIG. 12 illustrates a scan sequence utilizing packet acquisition of 2D Doppler data with reduced B-mode frame rate and 4 interleaved Doppler transmit directions. Doppler pulses 1202–1224 and B-mode pulses 1226–1242 are illustrated.

The scan sequence acquires 12 Doppler pulses for every 4 B-mode pulses that are acquired. In FIG. 12, $\Delta N_B$=4, $N_B$=10, and M=5/2. If $N_B$ is fixed by other parts of the ultrasound system 100, it may not be possible to find a suitable value of M that makes $N_B$/M an integer. It is not necessary, however, for M to be an integer, but M may be a rational number. To achieve a uniform Doppler frame rate, a pause is inserted into the scan sequence, as illustrated in FIG. 13.

Figure 13:
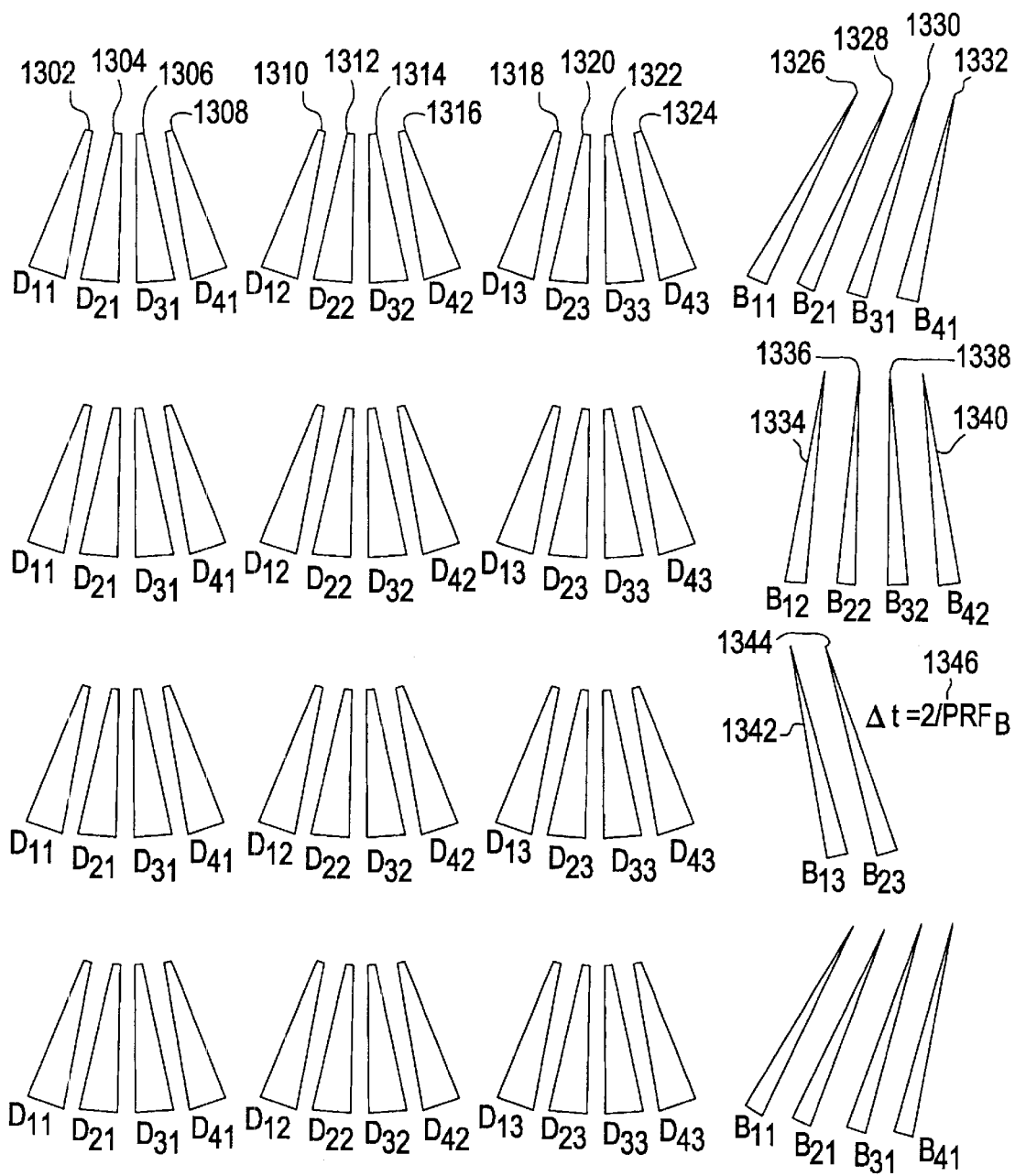
FIG. 13 illustrates a scan sequence of a 2D Doppler acquisition utilizing packet acquisition of 2D Doppler data with a reduced B-mode frame rate, 4 interleaved Doppler transmit directions, and a pause inserted to achieve a constant Doppler frame rate obtained in accordance with an embodiment of the present invention.

FIG. 13 illustrates a scan sequence utilizing packet acquisition of 2D Doppler data with a reduced B-mode frame rate, 4 interleaved Doppler transmit directions, and a pause inserted to achieve a constant Doppler frame rate. Doppler pulses 1302–1324, B-mode pulses 1326–1344, and a pause 1346 are illustrated.

Without the inserted pause 1346, the value of M in FIG. 13 would be M=5/2, as illustrated in FIG. 12. By inserting the pause 1346, the value of M is an integer, and M=3. The length of the pause 1346 is calculated by $\Delta t$=2/$PRF_B$.

The packet acquisition scan sequences illustrated in FIGS. 8 through 13 enhance the B-mode image quality in high frame rate 2D Doppler acquisition. Packet acquisition allows flexibility in choosing $PRF_D$, thus aliasing of the velocity estimates can be avoided. In addition, it is not necessary for $FR_D$ to equal $FR_B$, as illustrated by scan sequences in FIGS. 3 through 6.

Figure 14:
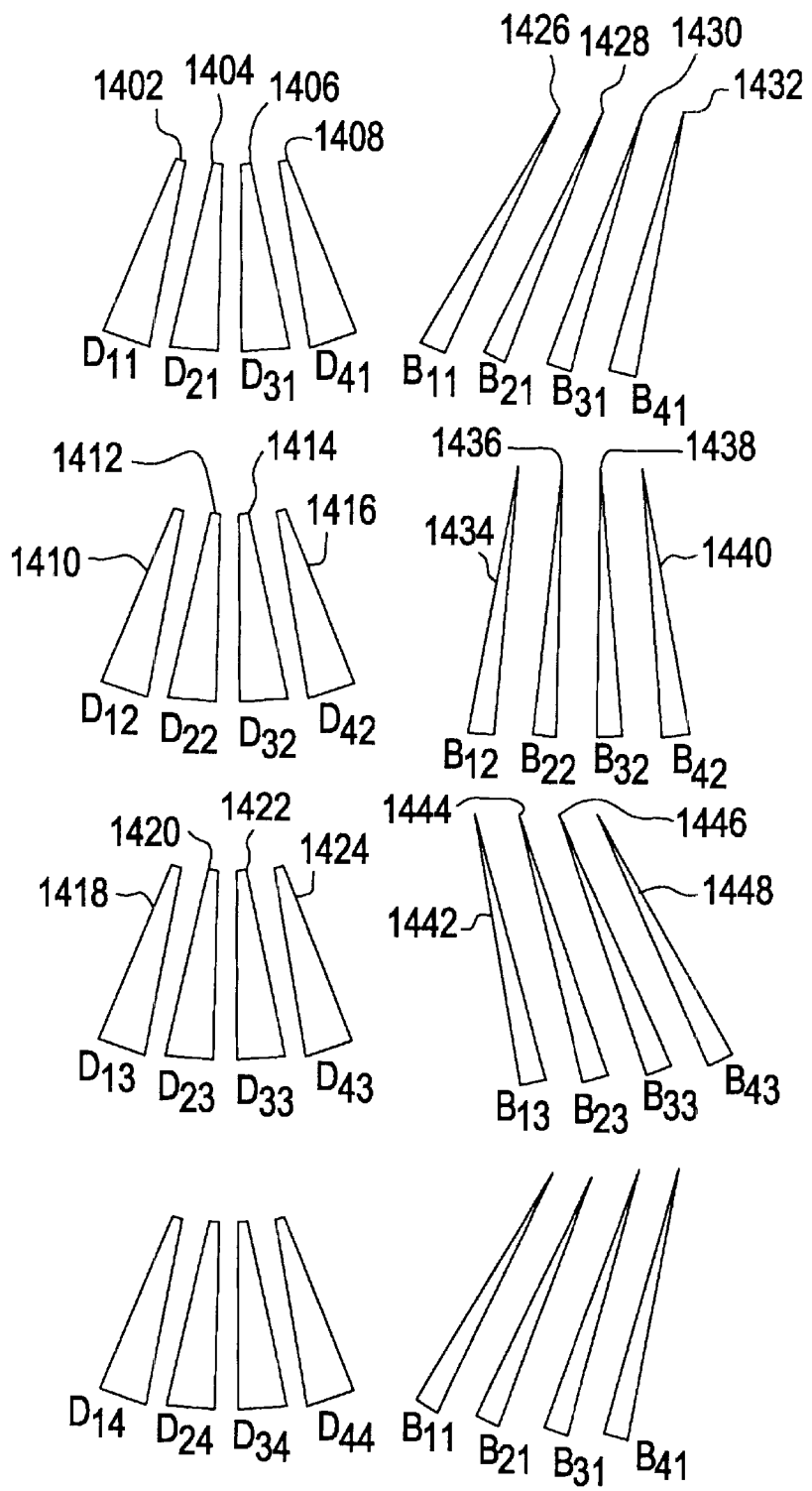
FIG. 14 illustrates a scan sequence of a 2D Doppler acquisition utilizing continuous 2D Doppler acquisition with a reduced B-mode frame rate obtained in accordance with an embodiment of the present invention.

By further reducing the PRF, a number of B-mode pulses can be interleaved between each Doppler scan as illustrated in FIG. 14. FIG. 14 illustrates a scan sequence utilizing continuous 2D Doppler acquisition with a reduced B-mode frame rate. Doppler pulses 1402–1424 and B-mode pulses 1426–1448 are illustrated. Continuous acquisition is similar to the common Doppler and B-mode pulse technique illustrated in FIG. 7, and differs from the packet acquisition technique in that only one Doppler pulse is transmitted in each beam direction before transmitting any B-mode pulses. Thus, for each beam direction there is a continuous stream of Doppler data with constant sampling intervals in the temporal direction.

For example, FIG. 14 utilizes four transmit directions, or $N_D$=4. Doppler pulses 1402–1408 are each transmitted in a different direction, then the B-mode pulses 1426–1432 are transmitted. Doppler pulses 1410–1416 are then transmitted, one in each of the four transmit directions, followed by B-mode pulses 1434–1440. If sliding window processing is utilized, as described in reference to FIG. 7, a significant increase in the frame rate compared to packet acquisition is possible.

Figure 15:
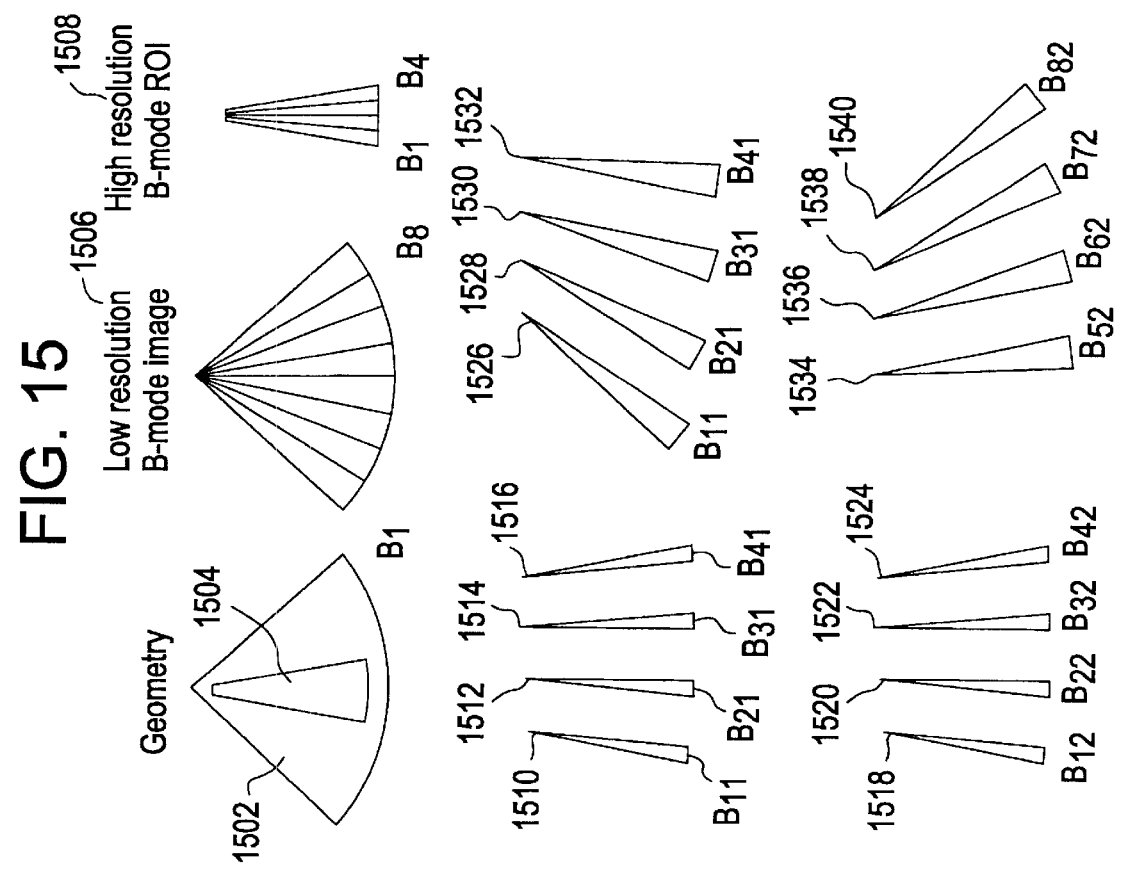

Continuous acquisition can also be utilized to acquire a high resolution B-mode image inside a ROI and a low resolution B-mode image of the area surrounding the ROI. FIG. 15 illustrates a scan sequence utilizing continuous B-mode acquisition and a second B-mode acquisition with a reduced frame rate. In FIG. 15, a high resolution B-mode ROI 1504 is illustrated surrounded by a low resolution B-mode image 1502. Beam density is illustrated in the low resolution B-mode image 1506 and the high resolution B-mode ROI 1508. The low resolution B-mode image 1506 is scanned with a lower beam density than the high resolution B-mode ROI 1508. B-mode pulses 1526–1540 scan the low resolution B-mode area 1502. B-mode pulses 1510–1516 scan the high resolution ROI 1504 to form a first acquired image of the high resolution ROI 1504, and B-mode pulses 1518–1524 scan the high resolution ROI 1504 to form a second acquired image of the high resolution ROI 1504. In this example, the high resolution B-mode ROI 1504 is scanned twice as often as the low resolution B-mode image 1502. In one embodiment, the high resolution B-mode pulses 1510–1524 may be used to form the underlying low resolution B-mode image 1502. Therefore, it is not necessary to scan with B-mode pulses 1526–1540 the portions of the low resolution B-mode image 1502 angularly underlying the high resolution B-mode ROI 1504. Thus, the number of pulse transmissions can be reduced, and frame rates are increased. In the illustrated example, B-mode pulses 1532 ($B_{41}$) and 1534 ($B_{52}$) may be omitted as B-mode pulses 1532 and 1534 angularly underlie the high resolution B-mode ROI 1504.

Figure 16:
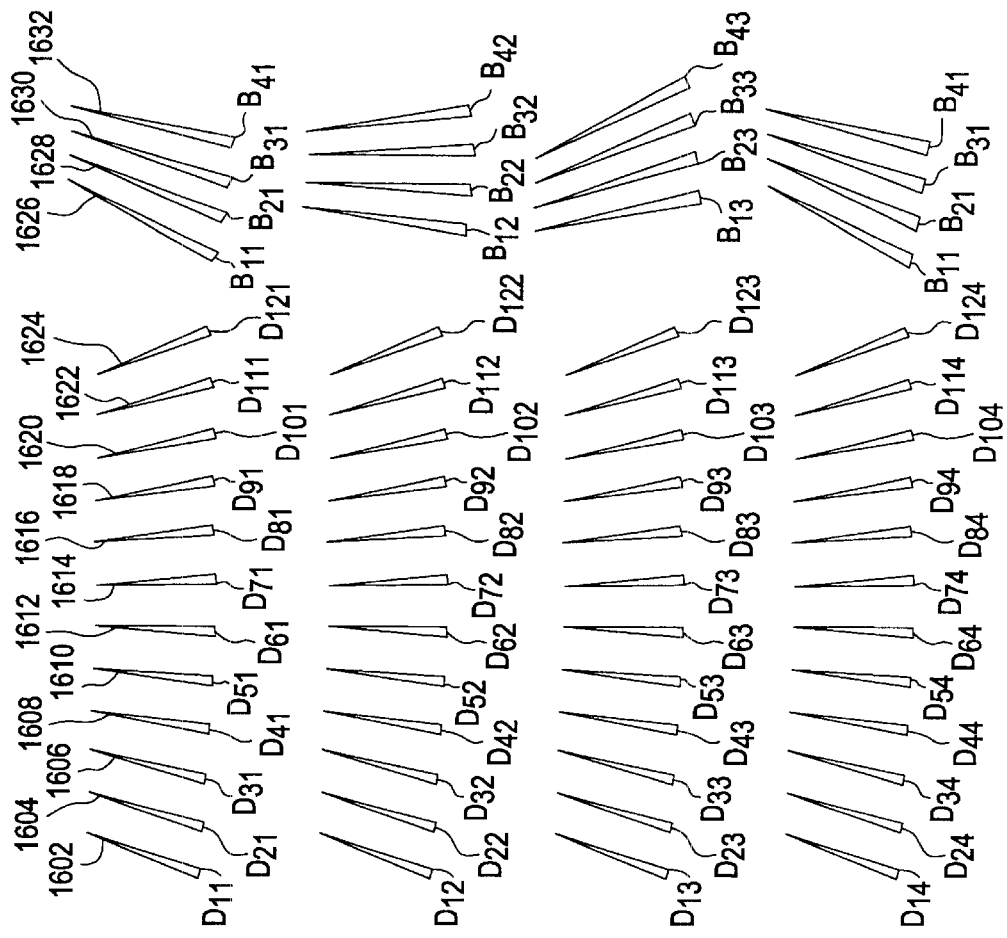
FIG. 16 illustrates a scan sequence of a 2D Doppler acquisition utilizing continuous 2D Doppler acquisition with an increased number of Doppler transmit directions and a reduced B-mode frame rate obtained in accordance with an embodiment of the present invention.

Alternatively, the Doppler frame rate may be kept constant while increasing the number of Doppler transmit beam directions as shown in FIG. 16. FIG. 16 illustrates a scan sequence utilizing continuous 2D Doppler acquisition with an increased number of Doppler transmit directions and a reduced B-mode frame rate. Doppler pulses 1602–1624 and B-mode pulses 1626–1632 are illustrated. As in FIG. 14, one Doppler pulse 1602–1624 is transmitted in each beam direction before transmitting any B-mode pulses 1626–1632. The Doppler data may be processed utilizing the sliding window technique. Sliding window processing is possible with any combination of B-mode and Doppler pulses, provided that the Doppler pulses along each scanline direction are equally spaced in time.

Below is an example of the performance achieved for continuous acquisition with B-mode and Doppler frame rates that are different. The parameters are suitable for cardiac imaging, and the B-mode $PRF_B$ is lower than the Doppler $PRF_D$ to minimize reverberation effects.

| | |
|---|---|
| M = 10 | |
| $\Delta N_B = 4$ | $N_D = 10$ |
| $PRF_B = 3$ kHz | $PRF_{Dmax} = PRF_D * IGS = 4$ kHz |
| $MLA_B = 2$ | $MLA_D = 4$ |
| Frame rate Doppler: | $FR_D = PRF_D = 1/(\Delta N_B/PRF_B + N_D/PRF_{Dmax}) = 260$ Hz |
| Frame rate B-mode: | $FR_B = FR_D/M = 26$ Hz |
| Receive beams Doppler: | $MLA_D * N_D = 40$ |
| Receive beams B-mode: | $MLA_B * \Delta N_B * M = 80$ |

Figure 17:
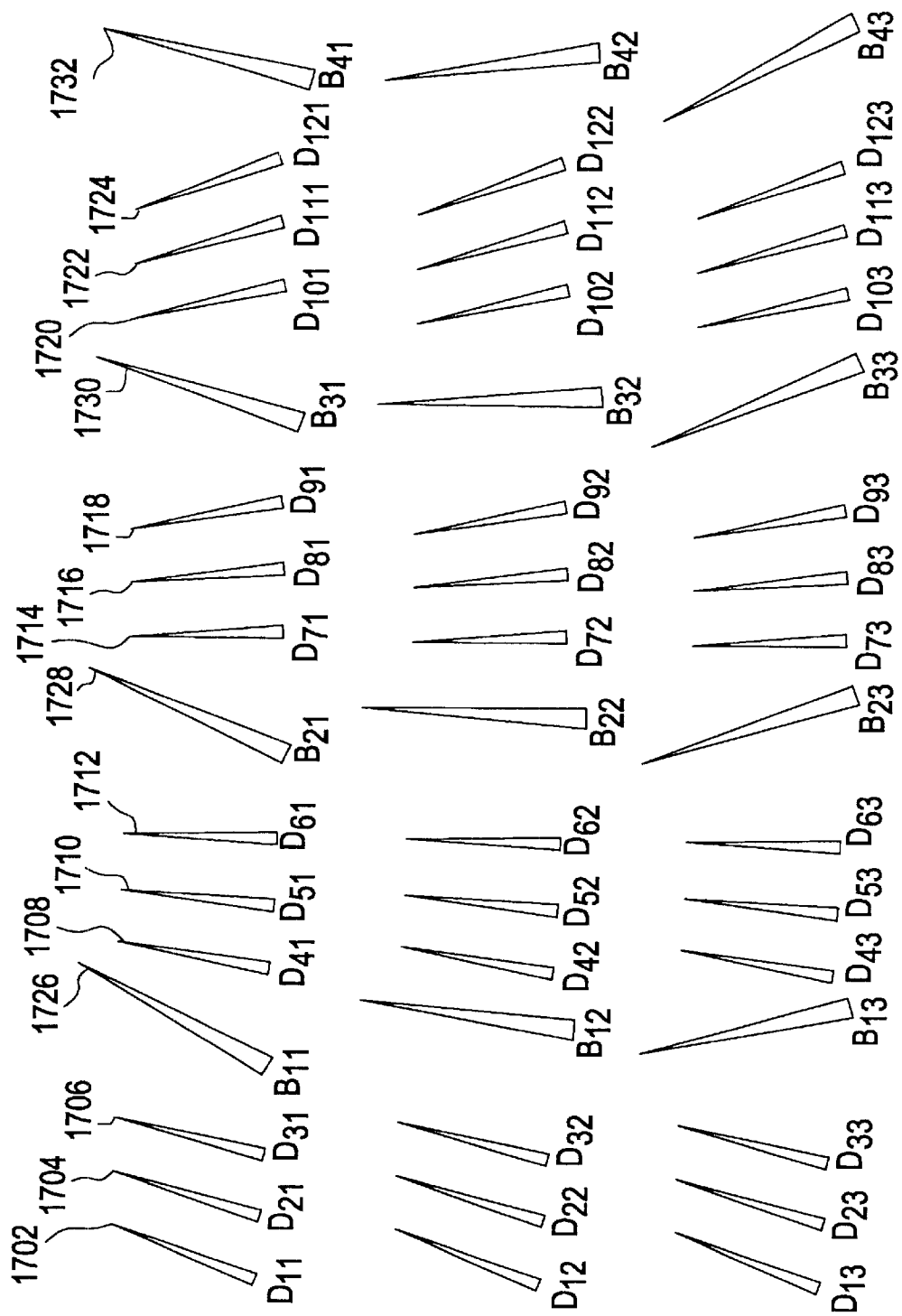
FIG. 17 illustrates a scan sequence of a 2D Doppler acquisition utilizing continuous acquisition of Doppler data, with B-mode pulses interleaved between the Doppler pulses obtained in accordance with an embodiment of the present invention.

In general, the pulses in the B-mode sub-region can be interleaved between Doppler pulses as shown in FIG. 17. FIG. 17 illustrates a scan sequence utilizing continuous acquisition of Doppler data, with B-mode pulses interleaved between the Doppler pulses. Doppler pulses 1702–1732 and B-mode pulses 1726–1632 are artifacts due to time differences between neighboring beams in the B-mode images, but may also introduce reverberation artifacts in the Doppler images.

The continuous acquisition has so far been illustrated by integer values for M, where M represents the factor by which the B-mode frame rate ($FR_B$) is decimated relative to the Doppler frame rate ($FR_D$). As with packet acquisition, any fraction $M=FR_D/FR_B$ is possible in continuous acquisition.

Figure 18:
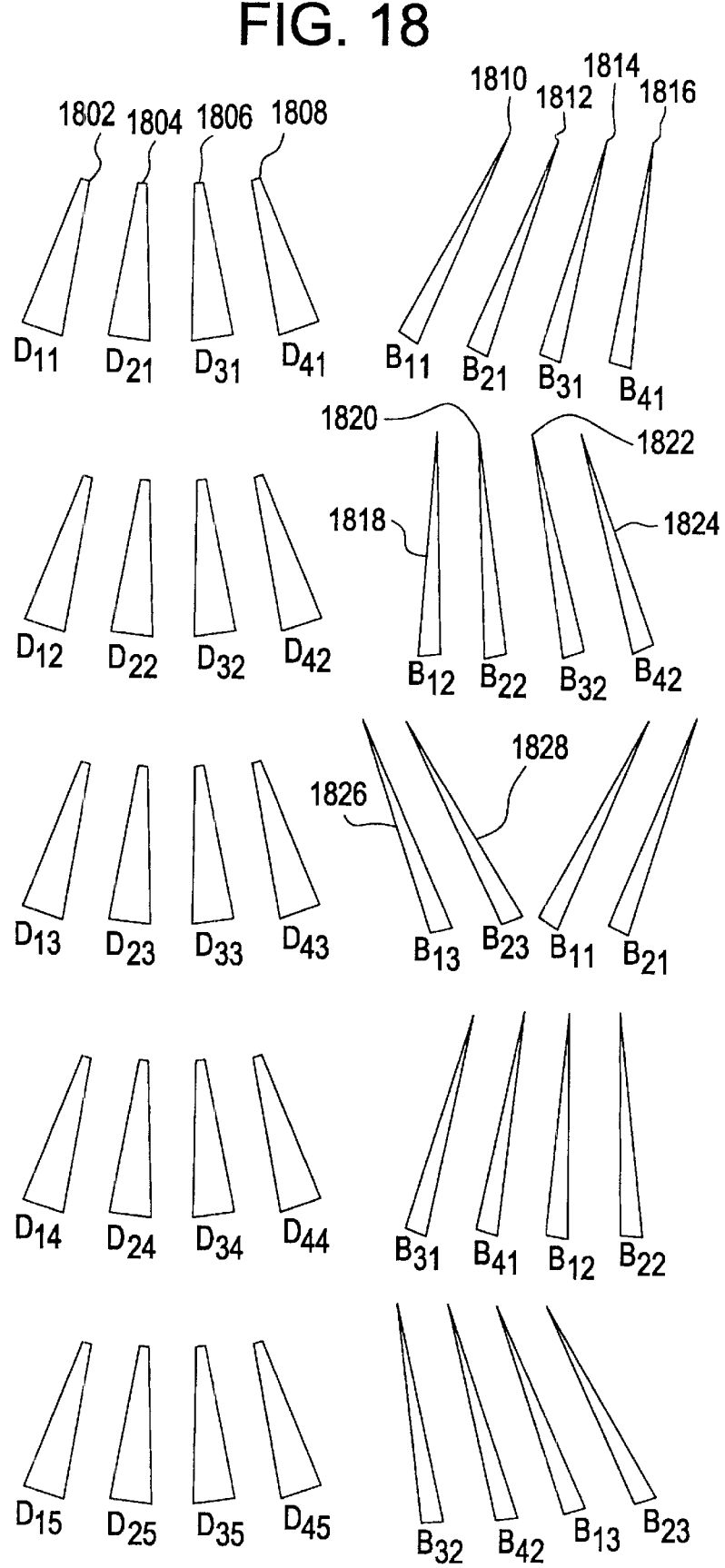
FIG. 18 illustrates a scan sequence of a 2D Doppler acquisition utilizing continuous acquisition with a non-integer ratio between the Doppler frame rate and the B-mode frame rate obtained in accordance with an embodiment of the present invention.

FIG. 18 illustrates a scan sequence utilizing continuous acquisition with a non-integer ratio between the Doppler frame rate and the B-mode frame rate. Doppler pulses 1802–1808 and B-mode pulses 1810–1828 are illustrated. FIG. 18 presents an example with $\Delta N_B=4$, $N_D=4$ and $M=5/2$. Non-sequential scanning of the B-mode sector is sometimes used to increase $PRF_B$. The non-sequential firing patterns may lead to an $N_B$ which results in non-integer $N_B/M$ ratios for suitable values of M. This can be resolved by inserting a pause in the scan sequence to ensure constant intervals between Doppler pulses in the same direction as shown in FIG. 19.

Figure 19:
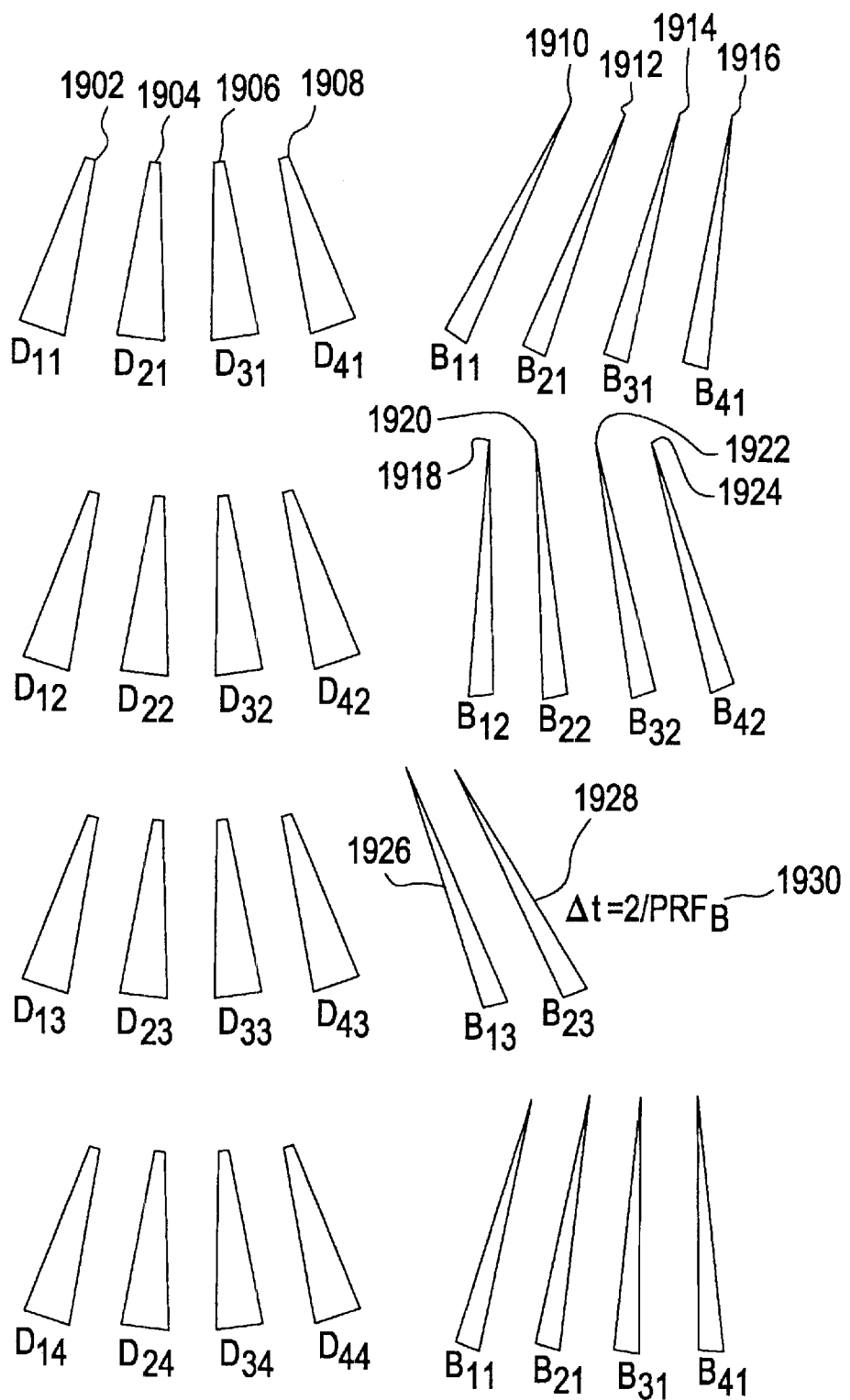
FIG. 19 illustrates a scan sequence of a 2D Doppler acquisition utilizing continuous acquisition with a pause inserted into the scan sequence to obtain a constant time interval between Doppler pulses in the same direction obtained in accordance with an embodiment of the present invention.

FIG. 19 illustrates a scan sequence utilizing continuous acquisition with a pause inserted into the scan sequence to obtain a constant time interval between Doppler pulses in the same direction. Doppler pulses 1902–1908, B-mode pulses 1910–1928, and a pause 1930 are illustrated.

Without the inserted pause 1930, the value of M in FIG. 19 would be $M=5/2$, as illustrated in FIG. 18. By inserting the pause 1930, the value of M is an integer, and M=3. The length of the pause 1930 is calculated by $\Delta t=2/PRF_B$.

Scan sequences utilizing continuous acquisition, such as sequences illustrated in FIGS. 14–19, allow for a higher Doppler frame rate than scan sequences utilizing packet acquisition. In addition, the continuous stream of data with constant sampling interval makes sliding window processing possible. This means that spectrum Doppler and sound generation are possible at arbitrary points in the 2D image. The spectrum Doppler display enables the operator to visually differentiate moving objects and stationary reverberations. This is a more robust technique than velocity traces based on a mean velocity estimator. Additionally, more efficient clutter filtering is possible, and tissue tracking is easier when the data have constant sampling intervals. One disadvantage to continuous acquisition is that the PRF is equal to the frame rate, thus making correction for aliasing in velocity estimates necessary. However, there are no severe aliasing artifacts in strain rate imaging images calculated from data acquired with the continuous acquisition method.

While the invention has been described with reference to at least one embodiment, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for obtaining diagnostic ultrasound images, the method comprising:
   transmitting a first set of ultrasound pulses at a first frame rate in accordance with a first mode of operation;
   receiving echoes from the first set of ultrasound pulses;
   transmitting a second set of ultrasound pulses at a second frame rate in accordance with a second mode of operation, said first frame rate differing from said second frame rate;
   receiving echoes from the second set of ultrasound pulses; and
   displaying a single image representative of echoes received from both of said first and second sets of ultrasound pulses.

2. The method of claim 1, wherein the first set of ultrasound pulses is transmitted at a higher frame rate than the second set of ultrasound pulses.

3. The method of claim 1, wherein the first set of ultrasound pulses defines a Doppler image, and the second set of ultrasound pulses defines a B-mode image, said displaying step overlaying said Doppler and B-mode images.

4. The method of claim 1, wherein the transmitting steps include obtaining a single Doppler image frame from the first set of ultrasound pulses and obtaining first and second portions of a single B-mode image frame before and after respectively obtaining the complete Doppler image frame.

5. The method of claim 1, wherein the first set of ultrasound pulses defines a high resolution portion of a B-mode image, and the second set of ultrasound pulses defines a low resolution portion of a B-mode image, said high and low resolution portions forming said single image that is displayed.

6. The method of claim 1, wherein the echoes from the second set of ultrasound pulses define a partial image and the echoes from the first set of ultrasound pulses define an entire image, said displaying step overlaying the partial and entire images.

7. The method of claim 1, wherein the first set of ultrasound pulses defines a high resolution image, and the second set of ultrasound pulses defines a low resolution image.

8. The method of claim 1, further comprising:
   transmitting a series of uninterrupted, successive pulses in a common direction relative to an area being scanned;
   detecting a series of echoes from the series of uninterrupted, successive pulses; and
   calculating a portion of a Doppler image from the series of echoes, said portion of the Doppler image corresponding to the common direction.

9. The method of claim 1, wherein the first set of ultrasound pulses is interleaved with the second set of ultrasound pulses.

10. The method of claim 1, wherein transmitting the first set of ultrasound pulses further comprises:

transmitting at least one ultrasound pulse in a first direction corresponding to a first portion of the single image;

transmitting an ultrasound pulse in a second direction corresponding to a second portion of the single image;

transmitting a second ultrasound pulse in said first direction; and transmitting a second ultrasound pulse in said second direction.

11. A method for obtaining ultrasound images of an area of interest, the method comprising:

transmitting a set of Doppler pulses in accordance with a Doppler mode of operation;

receiving Doppler echoes from the set of Doppler pulses;

after receiving the Doppler echoes, transmitting a set of non-Doppler pulses in accordance with another mode of operation differing from the Doppler mode of operation, wherein said set of non-Doppler pulses corresponds to a sub-region of a displayed image;

receiving non-Doppler echoes from the set of non-Doppler pulses; and displaying images based on the Doppler and non-Doppler echoes from the Doppler and non-Doppler pulses.

12. The method of claim 11, wherein said transmitting step includes transmitting a first packet of successive pulses directed in a first direction relative to an area of interest followed by a second packet of successive pulses directed in a second direction relative to an area of interest.

13. The method of claim 11, wherein said transmitting step further comprises transmitting one pulse of a first packet of pulses in a first direction relative to an area of interest followed by transmitting one pulse of a second packet of pulses in a second direction relative to an area of interest followed by transmitting a second pulse of said first packet of pulses in said first direction.

14. The method of claim 11, further comprising:

transmitting at least one Doppler pulse corresponding to a first sub-region of an image; and immediately receiving echoes from the Doppler pulse, transmitting at least one Doppler pulse corresponding to a second sub-region of the image.

15. The method of claim 11, wherein said transmitting step further comprises:

transmitting a first packet of successive Doppler pulses directed in a first direction relative to an area of interest; and after receiving the echoes from a subset of said set of non-Doppler pulses, transmitting a second packet of successive Doppler pulses in a second direction relative to an area of interest.

16. The method of claim 11, wherein the second transmitting step includes transmitting at least one non-Doppler pulse corresponding to a sub-region of an image, and wherein the echoes from the non-Doppler pulses form a partial image.

17. The method of claim 11, wherein the set of Doppler pulses defines N frames of Doppler images and the set of non-Doppler pulses defines M frames of non-Doppler images, and wherein M is less than N.

18. The method of claim 11, wherein the transmit and receive steps form a scan sequence divided into scan intervals, each Doppler and non-Doppler pulse being transmitted and received in a unique, non-overlapping scan interval, further comprising:

suspending the transmitting and receiving steps during at least one scan interval in a sequence of scan intervals, in which non-Doppler pulses are being transmitted and received.

19. The method of claim 11, wherein the transmit and receive steps form a scan sequence divided into scan intervals, wherein a subset of non-Doppler pulses is transmitted and received during each scan interval, further comprising:

transmitting in a first scan interval at least one non-Doppler pulse associated with a first sub-region of a non-Doppler image; and transmitting in a second scan interval at least one non-Doppler pulse associated with a second sub-region of a non-Doppler image.

20. The method of claim 11, wherein said transmitting and receiving steps form a scan sequence divided into scan intervals of equal duration.

21. The method of claim 11, wherein said transmitting a set of non-Doppler pulses includes transmitting at least one non-Doppler pulse corresponding to a sub-region of the image, wherein the received Doppler echoes form a complete image, and wherein the received non-Doppler echoes form a partial image.

22. The method of claim 11, wherein said image based on the received Doppler echoes is calculated by utilizing a sliding window technique.

23. The method of claim 11, wherein said image based on the received echoes from the Doppler pulses is comprised of a number of transmit directions, and wherein the first transmitting step further comprises:

transmitting one Doppler pulse in each said transmit direction.

24. The method of claim 11, wherein the Doppler and non-Doppler pulses are transmitted at a predefined pulse repetition time, further comprising the step of pausing during the transmitting steps by a duration greater than the pulse repetition time.

* * * * *